(12) United States Patent
Mizoguchi et al.

(10) Patent No.: US 10,047,262 B2
(45) Date of Patent: Aug. 14, 2018

(54) CERIUM OXIDE ABRASIVE, METHOD FOR PRODUCING CERIUM OXIDE ABRASIVE, AND POLISHING METHOD

(71) Applicant: Konica Minolta, Inc., Chiyoda-ku (JP)

(72) Inventors: Keisuke Mizoguchi, Hachioji (JP); Akihiro Maezawa, Hino (JP); Atsushi Takahashi, Musashino (JP); Natsuki Ito, Hachioji (JP); Natsumi Hirayama, Hino (JP); Hideaki Wakamatsu, Yokohama (JP)

(73) Assignee: Konica Minolta, Inc., Tokyo (JP)

( * ) Notice: Subject to any disclaimer, the term of this patent is extended or adjusted under 35 U.S.C. 154(b) by 233 days.

(21) Appl. No.: 14/901,229

(22) PCT Filed: Jun. 18, 2014

(86) PCT No.: PCT/JP2014/066143
§ 371 (c)(1),
(2) Date: Dec. 28, 2015

(87) PCT Pub. No.: WO2014/208414
PCT Pub. Date: Dec. 31, 2014

(65) Prior Publication Data
US 2016/0272860 A1    Sep. 22, 2016

(30) Foreign Application Priority Data

Jun. 27, 2013  (JP) .................. 2013-134687
Aug. 9, 2013   (JP) .................. 2013-166051
Sep. 11, 2013  (JP) .................. 2013-187903

(51) Int. Cl.
*B24B 37/04*  (2012.01)
*C09K 3/14*   (2006.01)
*C01F 17/00*  (2006.01)

(52) U.S. Cl.
CPC .......... *C09K 3/1454* (2013.01); *B24B 37/044* (2013.01); *C01F 17/0043* (2013.01);
(Continued)

(58) Field of Classification Search
CPC .. B24B 37/044; C09K 3/1454; C09K 3/1436; C09K 3/1445; C09K 3/1463
(Continued)

(56) References Cited

U.S. PATENT DOCUMENTS

2005/0136803 A1* 6/2005 Ohashi ................. C03C 19/00
                                                    451/41
2005/0148291 A1* 7/2005 Ohashi ................. B24B 37/044
                                                    451/41

FOREIGN PATENT DOCUMENTS

JP    2003-020224    1/2003
JP    2003-238943    8/2003
(Continued)

OTHER PUBLICATIONS

B. Aiken, "Preparation of Properties of Monodispersed Colloidal Particles of Lanthanide Compounds: III, Yttrium (III) and Mixed Yttrium (III)/Cerium (111) Systems", Journal of the American Ceramic Society, vol. 71, No. 10, pp. 845-853, (1988).

*Primary Examiner* — Robert Rose
(74) *Attorney, Agent, or Firm* — Cozen O'Connor

(57) ABSTRACT

An object of the present invention is to provide a cerium oxide abrasive material containing cerium oxide abrasive particles prepared by a synthetic method using an aqueous solution of a salt of a rare earth element and a precipitant, the cerium oxide abrasive particles having a spherical shape and high polishing performance (polishing rate and polishing precision of the polished surface), a method for producing the cerium oxide abrasive material, and a polishing method. The cerium oxide abrasive material according to the present invention comprises spherical cerium oxide abrasive particles prepared by a synthetic method using an aqueous
(Continued)

solution of a salt of a rare earth element and a precipitant, wherein the cerium oxide abrasive particles have a spherical shape having an average aspect ratio within the range of 1.00 to 1.15.

16 Claims, 7 Drawing Sheets

(52) U.S. Cl.
CPC .......... *C09K 3/1436* (2013.01); *C09K 3/1445* (2013.01); *C09K 3/1463* (2013.01); *C01P 2004/03* (2013.01); *C01P 2004/32* (2013.01); *C01P 2004/54* (2013.01); *C01P 2004/62* (2013.01); *C01P 2004/64* (2013.01)

(58) Field of Classification Search
USPC ........................ 451/28, 41; 51/307, 309, 293
See application file for complete search history.

(56) References Cited

FOREIGN PATENT DOCUMENTS

| | | |
|---|---|---|
| JP | 2008-515764 | 5/2008 |
| JP | 2009-515807 | 4/2009 |
| JP | 2010-526433 | 7/2010 |
| JP | 2012-122042 | 6/2012 |
| JP | 2012-135866 | 7/2012 |
| JP | 2012-224745 | 11/2012 |
| JP | 2013-110272 | 6/2013 |
| WO | WO 2012/101871 | 8/2012 |

\* cited by examiner

Core forming step → Shell forming step → Solid-liquid separation step → Firing step

CERIUM OXIDE ABRASIVE, METHOD FOR PRODUCING CERIUM OXIDE ABRASIVE, AND POLISHING METHOD

RELATED APPLICATIONS

This is a U.S. National Phase Application under 35 USC 371 of International Application PCT/JP2014/066143 filed on Jun. 18, 2014.

This application claims the priority of Japanese application nos. 2013-134687 filed Jun. 27, 2013, 2013-166051 filed Aug. 9, 2013 and 2013-187903 filed Sep. 11, 2013 the entire content of all of which are hereby incorporated by reference.

TECHNICAL FIELD

The present invention relates to cerium oxide abrasive materials, methods for producing cerium oxide abrasive materials, and polishing methods. The present invention more specifically relates to cerium oxide abrasive materials comprising spherical cerium oxide particles having high polishing performance (polishing rate), methods for producing the cerium oxide abrasive materials, and polishing methods.

BACKGROUND

Traditional abrasive materials used for precise polishing of glass optical elements, glass substrates, and semiconductor devices in their production processes are oxides of rare earth elements, mainly composed of cerium oxide and additionally containing lanthanum oxide, neodymium oxide, or praseodymium oxide. Although other abrasive materials, such as diamond, iron oxide, aluminum oxide, zirconium oxide, and colloidal silica, are also used, abrasive materials containing cerium oxide have been widely used due to their advantages such as a high polishing rate and low surface roughness of polished workpieces (surface smoothness thereof).

Most of commercially available cerium oxide particles as abrasive materials are typically prepared by a pulverization process. Such abrasive particles prepared by a pulverization process have sharply edged surfaces. These sharp edges of the particles, although increasing the polishing rate, readily scratch the surfaces of workpieces.

Glass optical elements, glass substrates, and semiconductor devices requiring high smoothness in order of angstrom (Å) are typically polished in two steps, primary polishing with cerium oxide particles having a high polishing rate, and then secondary polishing with colloidal silica of several tens of nanometers in size, to improve the smoothness of the surfaces (surface roughness) of workpieces.

Unfortunately, such a multi-stage polishing process reduces productivity. Due to an increasing requirement on the surface smoothness of workpieces, spherical abrasive particles should be developed which maintain a high polishing rate, and at the same time, barely cause scratch impairing the smoothness of the workpieces.

High-purity cerium oxide-based abrasive materials enabling precise polishing in the production process of optical glass are prepared by methods that involves adding a salt, such as carbonic acid, oxalic acid, or acetic acid, to an aqueous cerium solution containing purified cerous nitrate, cerous chloride, or cerous sulfate to precipitate a product, such as cerous carbonate, cerous oxalate, or cerous acetate, extracting this precipitate through filtration, and drying and firing the precipitate to prepare cerium oxide.

For example, NPL (non-patent literature) 1 describes a method that involves adding an aqueous urea solution as a precipitant to an aqueous solution of a rare earth element, such as an aqueous solution of cerium nitrate or yttrium nitrate, and heating the solution with stirring to prepare a precursor of abrasive particles having a narrow particle size distribution.

The present inventors fired the precursor of cerium oxide particles prepared by the method described in NPL 1 to form cerium oxide abrasive particles, and verified the polishing effect thereof. Unfortunately, the resulting abrasive particles had an insufficient polishing rate, which was not suitable for practical use. The present inventors clarified that the polishing rate was reduced due to a rare earth element other than the cerium element (such as yttrium) mixed to adjust the shape of the particle and the particle size distribution; this additional rare earth element relatively reduced the cerium concentration on the surfaces of the particles, and in turn, reduced the polishing rate.

PTL (Patent Literature) 1 discloses a polishing method with a composite particle composed of an organic particle and an inorganic particle applied onto the surface of the organic particle. Unfortunately, the composite particle prepared by the method disclosed in PTL 1 has a thin coating layer of the inorganic particle disposed over the surface of the organic particle, and oxygen barely diffuses inside such an inorganic particle layer, so that a large amount of trivalent cerium cannot be present on the surface of the particle. Additionally, the composite particle is significantly large, and cannot attain high surface smoothness of workpieces.

PTL 1 discloses a method of preparing a metal oxide particle prepared by heating a mixture of a metal salt, a high-molecular compound, and a high boiling point organic solvent to generate a metal oxide, and firing the metal oxide.

It is believed that cerium oxide particles typically used in polishing are composed of a large amount of trivalent cerium present on the surface of the cerium oxide particles and quadrivalent cerium stably present inside the particles, and the molecular bonds of the workpiece are broken by trivalent cerium present on the surfaces of the cerium oxide particles to progress polishing. This difference in valence of cerium between the surface and the inside of the particles, however, is small in agglomerates of nanoparticles, and trivalent cerium is barely present on the surfaces of the agglomerates. Accordingly, an increase in polishing rate is not expected.

It is believed as above that trivalent cerium contributes to polishing characteristics. The quadrivalent cerium, however, is more stable, and the unstable trivalent cerium cannot remain in the abrasive particles.

To solve this problem, PTLs 2 and 3 disclose methods of increasing the proportion of trivalent cerium in the structure of cerium oxide by adding impurities to a cerium compound to form a perovskite oxide.

Unfortunately, the methods disclosed in PTLs 2 and 3 cannot stably produce perovskite compounds in a large quantity, and a high proportion of impurities used in the methods precludes location of a large amount of trivalent cerium near the surfaces of the perovskite compounds.

PTL 4 discloses a method of preparing a metal oxide particle prepared by heating a mixture of a metal salt, a high-molecular compound, and a high boiling point organic solvent to generate a metal oxide, and firing the metal oxide.

Unfortunately, in the method disclosed in PTL 4, crystallites are aggregated into a particle. The particle is not spherical, and has an irregular surface to readily cause scratch on workpieces. Agglomerates of the aggregated particles composed of crystallites readily crash during polishing.

Furthermore, use of an organic solvent as a solvent requires a reaction at high temperature, reducing productivity. The high-molecular compound remaining on the surfaces of the particles aggregates during firing, leading to technical difficulties in control of the particle size.

PRIOR ART DOCUMENT

Patent Literature

PTL 1: Japanese Patent Application Laid-Open No. 2012-135866
PTL 2: Japanese Patent Application Laid-Open No. 2012-224745
PTL 3: Japanese Patent Application Laid-Open No. 2012-122042
PTL 4: Japanese Patent Application Laid-Open No. 2013-110272

Non-Patent Literature

NPL 1: J. Am. Ceram. Soc., vol. 71, No. 10, pp. 845 to 853 (1988)

SUMMARY OF THE INVENTION

Problems to be Solved by the Invention

The present invention has been made in consideration of these problems. An object of the present invention is to provide a cerium oxide abrasive material comprising cerium oxide abrasive particles prepared by a synthetic method using an aqueous solution of a salt of a rare earth element and a precipitant, the cerium oxide abrasive particle having a spherical shape and high polishing performance (polishing rate and polishing precision of the polished surface), a method for producing a cerium oxide abrasive material, and a polishing method.

Means to Solve the Problems

The present inventors, who have conducted extensive research to solve the problems, have found that a cerium oxide abrasive material comprising cerium oxide abrasive particles having a spherical shape and high polishing performance (polishing rate and polishing precision of the polished surface) can be achieved if the cerium oxide abrasive material is prepared with a spherical cerium oxide abrasive particle prepared by a synthetic method using an aqueous solution of a salt of a rare earth element and a precipitant, and having an average aspect ratio within the range of 1.00 to 1.15, and have completed the present invention.

Namely, the problems of the present invention are solved by the following aspects:

1. A cerium oxide abrasive material comprising spherical cerium oxide abrasive particles prepared by a synthetic method using an aqueous solution of a salt of a rare earth element and a precipitant,
wherein the cerium oxide abrasive particles have a spherical shape having an average aspect ratio within the range of 1.00 to 1.15.

2. The cerium oxide abrasive material according to Aspect 1, wherein the average content of trivalent cerium is within the range of 5 to 40 mol % of the total cerium content in a surface region ranging from the outermost layer of each cerium oxide abrasive particle to a depth of 10 nm toward the center of the particle.

3. The cerium oxide abrasive material according to Aspect 1 or 2, wherein a particle size $D_{50}$ (nm) determined from a cumulative size distribution curve of the cerium oxide abrasive particles is within the range of 50 to 500 nm.

4. The cerium oxide abrasive material according to any one of Aspects 1 to 3, wherein a particle size $D_{90}$ (nm) determined from the cumulative size distribution curve of the cerium oxide abrasive particles is within the range of 0.70 to 0.95 times the particle size $D_{50}$ (nm).

5. The cerium oxide abrasive material according to any one of Aspects 1 to 4, wherein a particle size $D_{90}$ (nm) determined from the cumulative size distribution curve of the cerium oxide abrasive particles is within the range of 1.10 to 1.35 times the particle size $D_{50}$ (nm).

6. The cerium oxide abrasive material according to any one of Aspects 1 to 5, wherein an average content of cerium in the cerium oxide abrasive particles is 81 mol % or more of the total content of all the rare earth elements in the particles.

7. The cerium oxide abrasive material according to Aspect 1 or 6, wherein a half width of a main peak in a powder X ray diffraction pattern of the cerium oxide abrasive particles is within the range of 0.17 to 0.25°.

8. The cerium oxide abrasive material according to Aspect 7, wherein the cerium oxide abrasive particles have a spherical shape having an average aspect ratio within the range of 1.00 to 1.02.

9. A method for producing a cerium oxide abrasive material, wherein the cerium oxide abrasive material according to any one of Aspects 1 to 6 is produced through steps 1 to 4:
Step 1: mixing an aqueous solution of a salt of a rare earth element containing cerium with a precipitant solution to prepare a reaction solution,
Step 2: heating the reaction solution to prepare an abrasive particle precursor,
Step 3: separating the abrasive particle precursor from the reaction solution, and
Step 4: firing the separated abrasive particle precursor to form cerium oxide abrasive particles.

10. The method for producing a cerium oxide abrasive material according to Aspect 9, wherein a firing temperature in the firing step is within the range of 450 to 900° C.

11. The method for producing the cerium oxide abrasive material according to Aspect 7 or 8, wherein the abrasive particles are prepared by firing at least a cerium oxide particle precursor mainly composed of cerium oxide precipitated in a solution, and the firing treatment is performed at a firing temperature within the range of 700 to 1000° C.

12. The method for producing a cerium oxide abrasive material according to Aspect 11, wherein a firing apparatus for firing the cerium oxide particle precursor in the firing step is a roller hearth kiln or a rotary kiln.

13. The method for producing a cerium oxide abrasive material according to Aspect 9, wherein the pH of the reaction solution at a reaction temperature is controlled within the range of 4.5 to 7.0 in step 2.

14. The method for producing a cerium oxide abrasive material according to Aspect 13, wherein urea is added to the reaction solution as a pH adjuster for the reaction solution.

15. The method for producing a cerium oxide abrasive material according to Aspect 13, wherein an aqueous acidic or alkaline solution is added to the reaction solution as pH adjusters for the reaction solution.

16. The method for producing a cerium oxide abrasive material according to any one of Aspects 13 to 15, wherein the pH of the reaction solution at a reaction temperature is controlled within the range of 5.0 to 6.5 in the step of preparing the abrasive particle precursor.

17. A polishing method for polishing with the cerium oxide abrasive material according to Aspect 7 or 8.

Effects of the Invention

The above aspects according to present invention provide a cerium oxide abrasive material comprising spherical cerium oxide abrasive particles having high polishing performance (polishing rate and smoothness of the polished surface), a method for producing the cerium oxide abrasive material, and a polishing method.

Although the mechanism and the action attaining the object and advantageous effects of the present invention are not clarified, the present inventors infer as follows.

The cerium oxide abrasive materials prepared by the conventional methods do not have a spherical shape, and have irregular surfaces to readily cause scratch on workpieces. In contrast, the cerium oxide abrasive material used in the present invention has high sphericity. The present inventors believe that the cerium oxide abrasive material according to the present invention containing such cerium oxide abrasive particles is suitable for precise polishing.

EMBODIMENTS TO CARRY OUT THE INVENTION

Figure 1:
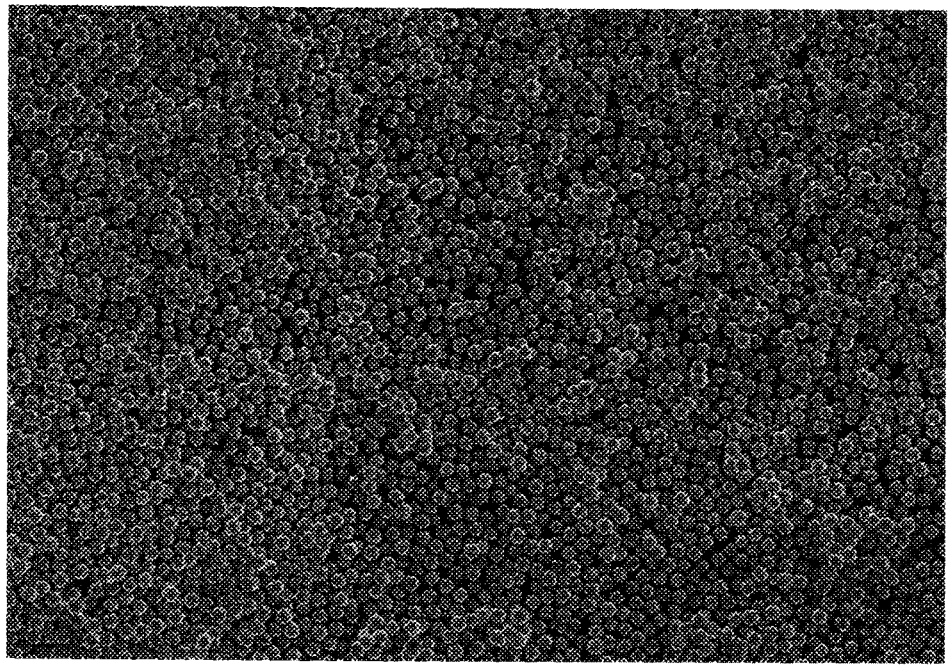
FIG. 1 is a scanning microscopic photograph, showing an exemplary abrasive particle containing Ce(III) according to the present invention.

The cerium oxide abrasive material according to the present invention comprises spherical cerium oxide abrasive particles prepared by a synthetic method using an aqueous solution of a salt of a rare earth element and a precipitant. The spherical cerium oxide abrasive particles have an average aspect ratio within the range of 1.00 to 1.15. This technical feature is common through Aspects 1 to 17 of the present invention.

In an embodiment according to the present invention, the average content of trivalent cerium is preferably within the range of 5 to 40 mol % of the total cerium content in a surface region ranging from the outermost layer of each cerium oxide abrasive particle to a depth of 10 nm toward the center of the particle to more certainly attain the target effects of the present invention.

The particle size $D_{50}$ (nm) determined from a cumulative particle size distribution curve of the cerium oxide abrasive particles is preferably within the range of 50 to 500 nm to achieve a higher polishing rate.

The particle size $D_{10}$ (nm) determined from the cumulative particle size distribution curve of the cerium oxide abrasive particles according to the present invention is preferably within the range of 0.70 to 0.95 times the particle size $D_{50}$ (nm), or the particle size $D_{90}$ (nm) determined from the cumulative particle size distribution curve is preferably within the range of 1.10 to 1.35 times the particle size $D_{50}$ (nm) to achieve an abrasive particle having significantly high monodispersion and attaining higher surface smoothness of workpieces and a higher polishing rate.

The average content of cerium in the cerium oxide abrasive particles is preferably 81 mol % or more of the total content of all the rare earth elements in the particles to achieve a higher polishing rate.

The half width of the main peak in the powder X ray diffraction pattern of the cerium oxide abrasive particles is preferably within the range of 0.17 to 0.25° to prevent scratch on the surfaces of workpieces even if the cerium oxide particles have high hardness. Preferably, the cerium oxide abrasive particles also have a spherical shape having an average aspect ratio within the range of 1.00 to 1.02.

The cerium oxide abrasive material according to the present invention is produced by the method for producing a cerium oxide abrasive material according to the present invention through the following steps 1 to 4.

Step 1: mixing an aqueous solution of a salt of a rare earth element containing cerium with a precipitant solution to prepare a reaction solution; Step 2: heating the reaction solution to prepare an abrasive particle precursor; Step 3: separating the abrasive particle precursor from the reaction solution; and Step 4: firing the separated abrasive particle precursor to form cerium oxide abrasive particles.

In a preferred embodiment of the method for producing a cerium oxide abrasive material according to the present invention, the firing temperature in the firing step is set within the range of 450 to 900° C. because trivalent cerium can be stably present in a predetermined concentration near the surface of the particle to attain a higher polishing rate.

The method for producing a cerium oxide abrasive material produces a cerium oxide abrasive material comprising cerium oxide abrasive particles having a half width of the main peak within the range of 0.17 to 0.25° in the powder X ray diffraction pattern. In this method, the abrasive particles are preferably produced by firing at least a cerium oxide particle precursor mainly composed of a cerium oxide precipitated in a solution. The firing treatment is preferably performed at a firing temperature within the range of 700 to 1000° C. Furthermore, the firing apparatus for firing the cerium oxide particle precursor in this firing step is preferably a roller hearth kiln or a rotary kiln.

In step 2, the pH of the reaction solution at the reaction temperature is preferably controlled within the range of 4.5 to 7.0 to produce abrasive particles having a high sphericity suitable for precise polishing. Furthermore, urea is preferably added to the reaction solution as a pH adjuster for the reaction solution to produce abrasive particles having a higher sphericity. Furthermore, an aqueous acidic or alkaline solution is preferably added to the reaction solution as pH adjusters for the reaction solution. The pH of the reaction solution at a reaction temperature in a step of preparing an abrasive particle precursor is preferably controlled within the range of 5.0 to 6.5.

Polishing is performed with a cerium oxide abrasive material comprising cerium oxide abrasive particles having a half width of the main peak within the range of 0.17 to 0.25° in a powder X ray diffraction pattern.

The cerium oxide abrasive particles according to the present invention and the method of producing the cerium oxide abrasive particles will now be described in detail. Throughout the specification, the term "to" between numeric values indicates that the numeric values before and after the term are inclusive as the lower limit and the upper limit, respectively.

Throughout the specification, the cerium oxide abrasive particles indicate a group of cerium oxide abrasive particles having the same configuration, and the cerium oxide abrasive material according to the present invention indicates slurries prepared by dispersing the cerium oxide abrasive particles in water or oil.

<<Cerium Oxide Abrasive Material>>

Typical abrasive materials are slurries of abrasive particles, such as red iron oxide ($\alpha Fe_2O_3$), cerium oxide, aluminum oxide, manganese oxide, zirconium oxide, and colloidal silica, dispersed in water or oil.

The cerium oxide abrasive material according to the present invention (hereinafter simply referred to abrasive material according to the present invention) comprises abrasive particles containing cerium oxide suitable for chemical mechanical polishing (CMP) of workpieces, such as semiconductor devices or glass, by both physical and chemical actions to achieve significantly high flatness of the polished surfaces of these workpieces at a sufficiently high polishing rate.

<<Cerium Oxide Abrasive Particle>>

The cerium oxide abrasive material according to the present invention comprises spherical cerium oxide abrasive particles prepared by a synthetic method using an aqueous solution of a salt of a rare earth element and a precipitant. The cerium oxide abrasive particles have a spherical form having an average aspect ratio within the range of 1.00 to 1.15.

[Average Aspect Ratio]

The cerium oxide abrasive particles according to the present invention have a spherical form having an average aspect ratio within the range of 1.00 to 1.15.

The average aspect ratio specified in the present invention can be determined by the following procedure.

The target cerium oxide abrasive particles are observed with a scanning microscope (SEM) to capture an SEM image, and 100 abrasive particles in the image are selected at random. The ratios a/b are determined from the long diameters a and the short diameters b of the selected cerium oxide abrasive particles, and are averaged to define the average aspect ratio of the cerium oxide abrasive particle. The long diameter a and the short diameter b are determined as follows: The rectangle circumscribing the abrasive particle (referred to as "circumscribed rectangle") is drawn. Among the short sides and the long sides of the circumscribed rectangles, the length of the shortest short side is defined as the short diameter b and the length of the longest long side is defined as the long diameter a.

The cerium oxide abrasive particles according to the present invention have an average aspect ratio within the range of 1.00 to 1.15, preferably within the range of 1.00 to 1.05.

Cerium oxide abrasive particles having an average aspect ratio within the range of 1.00 to 1.15 are classified as spherical particles whereas those having an average aspect ratio of more than 1.15 are classified as amorphous particles in the present invention.

An average aspect ratio closer to 1.00 indicates higher sphericity. The cerium oxide abrasive material according to the present invention comprising the cerium oxide abrasive particles according to the present invention having high sphericity is suitably used for precise polishing, and achieves high productivity due to its high polishing rate.

Figure 2:
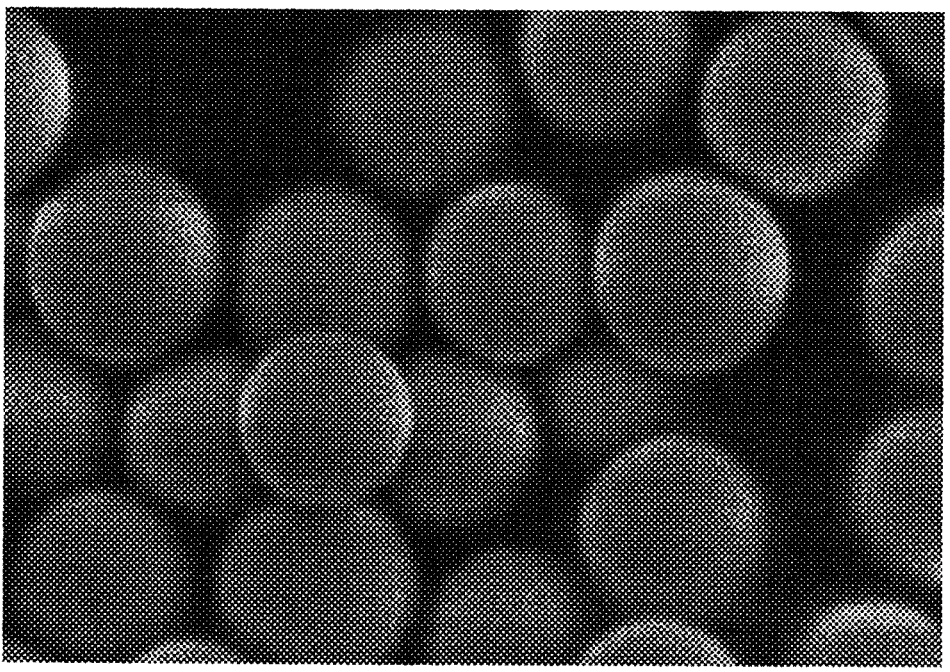
FIG. 2 is a scanning microscopic photograph showing another example of the abrasive particle containing Ce(III) according to the present invention.

FIG. 1 is a scanning microscopic photograph (SEM photograph, magnification: 2000×) of the cerium oxide abrasive particles according to the present invention prepared by a method of preparing homogeneous particles described later. FIG. 2 is an enlarged photograph (magnification: 30000×) of the SEM image of the particles in FIG. 1. These photographs show that the abrasive particles according to the present invention are spherical, and have high monodispersity.

Throughout the specification, the monodispersity can be determined by a coefficient of variation in the particle size distribution determined from a scanning microscopic photograph (SEM image) of a predetermined number of cerium oxide abrasive particles.

For example, the coefficient of variation (also referred to as "monodispersity") in the particle size distribution can be determined from an SEM image including 100 cerium oxide abrasive particles to evaluate the monodispersion. The particle size is defined as a projected area diameter determined on the basis of the area of the photographed image of the particle.

The coefficient of variation in the particle size distribution is determined from the following expression:

Coefficient of variation (%)={(standard deviation of particle size distribution)/(average particle size)}×100

The particle size and the distribution can be measured with an image analyzer (for example, LUZEX AP, made by NIRECO CORPORATION).

The coefficient of variation (monodispersity) in the particle size distribution of the abrasive particles according to the present invention is preferably 20.0% or less.

The abrasive material comprising abrasive particles having a high monodispersity barely forms scratch on the surfaces of workpieces, and is highly suitable for precise polishing.

Generation of scratch can be evaluated by visually observing the state of the surface of the polished glass substrate. Specifically, evaluation can be performed by counting the scratches.

The smoothness of the surface of the workpiece can be evaluated from the measurement of the surface roughness Ra. For example, the state of the surface of a glass substrate (surface roughness Ra) can be evaluated as follows: A glass substrate is polished for 30 minutes, and is measured with a surface profiler of a light interference type (Dual-channel ZeMapper made by Zygo Corporation) to evaluate the observed surface roughness Ra. The surface roughness Ra indicates the arithmetic average roughness in accordance with JIS B0601-2001.

The workpiece has a surface roughness Ra within the range of preferably 10 (Å) or less, more preferably 3.0 to 8.0 (Å).

The abrasive particles according to the present invention having an average aspect ratio within the range of 1.00 to 1.15 are prepared by a synthetic method using an aqueous solution of a salt of a rare earth element and a precipitant, rather than by a pulverization process. For example, such a synthetic method involves addition of an aqueous solution of a precipitant, such as an aqueous urea solution, to an aqueous solution of a salt of a rare earth element that contains at least cerium and is heated to a high temperature (such as 90° C. or more) to decompose urea into carbon dioxide and ammonia at the temperature and generate a rare earth element basic carbonate containing cerium (abrasive particle precursor), and then firing of the rare earth element basic carbonate into spherical abrasive particles having a substantially homogeneous composition containing cerium oxide and having an average aspect ratio within the range of 1.00 to 1.15 (hereinafter referred to as a method of preparing homogeneous particles). An alternative method involves preparation of a core-shell inorganic particulate precursor composed of a core containing at least one element selected from the group consisting of yttrium (Y), titanium (Ti), strontium (Sr), barium (Ba), samarium (Sm), europium (Eu), gadolinium (Gd), and terbium (Tb) and a shell containing a salt of at least one element selected from the group consisting of the eight elements and a salt of cerium (Ce), and firing of the core-shell inorganic precursor at a temperature within the range of 500 to 1200° C. into core-shell abrasive particles (hereinafter referred to as a method of preparing core-shell abrasive particles).

Specifically, the abrasive particles according to the present invention having an average aspect ratio within the range of 1.00 to 1.15 can be prepared through appropriate adjustment or control of the conditions, such as the time to mix the aqueous solution of a salt of a rare earth element with the aqueous solution of a precipitant under a high temperature environment, the reaction temperature, the reaction time, the concentration of the aqueous solution of a salt of a rare earth element or the aqueous solution of a precipitant during mixing, the firing temperature, and the firing time, in the step with the aqueous solution of a salt of a rare earth element and the aqueous solution of a precipitant.

The abrasive material according to the present invention preferably contains cerium oxide abrasive particles having an average content of trivalent cerium within the range of 5 to 40 mol % to the total cerium content in the surface region ranging from the outermost layer of each cerium oxide abrasive particle to a depth of 10 nm toward the center of the particles (hereinafter also simply referred to abrasive particles according to the present invention). The abrasive material according to the present invention contains the cerium oxide abrasive particles in an amount of more preferably 80 mass % or more, still more preferably 90 mass % or more, particularly preferably 98 mass % or more.

[Trivalent Cerium on Surface]

The cerium oxide abrasive particles contained in the abrasive material according to the present invention preferably have a spherical shape, and the average content of trivalent cerium to the total cerium content in a surface region ranging from the outermost layer of each cerium oxide abrasive particle to a depth of 10 nm toward the center of the particle is preferably within the range of 5 to 40 mol %. Although the mechanism and the action of such a configuration are not clarified yet, the present inventors infer the following reason why this configuration can achieve the target effects of the present invention.

Abrasive particles containing a rare earth element cerium in a high proportion can attain a high polishing rate. Abrasive particles prepared by a pulverization process, for example, have sharply edged surfaces. The sharply edged surfaces of the particles readily form scratch on the surfaces of workpieces although attaining a high polishing rate.

The chemical polishing action of cerium oxide is known as withdrawing of electrons of oxygen present on the surface of glass by a larger amount of unstable trivalent Ce ($Ce_2O_3$) than that of stable quadrivalent Ce ($CeO_2$) near the surface of the abrasive particle. Accordingly, a large amount of trivalent cerium present on the surface of the cerium oxide particle is important to maximize the chemical polishing action of cerium oxide.

To locate the trivalent cerium on the surfaces of the particles, the oxygen atoms on the surfaces of the particles should be diffused toward the centers of the particles to generate oxygen defects on the surfaces of the particles. Generation of the oxygen defects requires a certain volume required for diffusion of oxygen atoms or distance (depth) from the surfaces of the abrasive particles.

The synthetic method according to the present invention using an aqueous solution of a salt of a rare earth element and a precipitant can prepare spherical cerium oxide abrasive particles having controlled crystallinity and highly monodispersed. Such spherical cerium oxide abrasive particles allow oxygen atoms to efficiently diffuse through the oxygen defects into the particles, so that the trivalent cerium can be disposed in the surface regions of the abrasive particles in an amount within a specific range.

Furthermore, the cerium oxide abrasive particles contained in the abrasive material according to the present invention preferably have the following particle sizes determined from the cumulative particle size distribution curve of the cerium oxide abrasive particles: a particle size $D_{50}$ (nm) within the range of 50 to 500 nm, a particle size $D_{50}$ (nm) within the range of 0.70 to 0.95 times the particle size $D_{50}$ (nm), and a particle size $D_{90}$ (nm) within the range of 1.10 to 1.35 times the particle size $D_{50}$ (nm).

[Average Contents of Trivalent Cerium and Quadrivalent Cerium on Surface of Particle Region and Method for Measuring Average Contents]

The average content of trivalent cerium to the total cerium content in the surface region ranging from the outermost layer of each cerium oxide abrasive particle to a depth of 10 nm toward the center of the particle is within the range of 5 to 40 mol % in the cerium oxide abrasive particles according to the present invention. More preferably, the average content of trivalent cerium to the total cerium content in the surface region is within the range of 15 to 40 mol %.

A desired polishing rate can be attained if the average content of trivalent cerium in the surface region is 5 mol % or more, and spherical particles having high monodispersity can be stably formed if the average content is 40 mol % or less.

The average content of trivalent cerium in the surface region in the present invention can be controlled within the range specified by the present invention by the following method: An aqueous solution of a salt of a rare earth element and a precipitant are used to prepare highly monodispersive spherical cerium oxide abrasive particles and an average aspect ratio within the range of 1.00 to 1.15, and the firing temperature and the oxygen concentration during the firing step are appropriately adjusted.

The firing temperature is preferably within the range of 450 to 900° C. The oxygen atmosphere during firing has an oxygen content within the range of preferably 10 ppm to 20%, more preferably 10 to 1000 ppm. A higher oxygen concentration decreases the average content of trivalent cerium in the surface region while a lower oxygen concentration increases the average content of trivalent cerium in the surface region.

Accordingly, a desired average content of trivalent cerium can be attained in the present invention through an appropriate combination of the firing temperature and the concentration of the oxygen atmosphere in the firing step.

A specific method of determining the content of the trivalent cerium in the surface region will now be described. The average content of trivalent cerium in the surface regions of the cerium oxide abrasive particles according to the present invention can be determined by the following method.

The content of trivalent cerium and that of quadrivalent cerium in the surface region ranging from the outermost layer to a depth of 10 nm toward the center of a particle are preferably determined by X-ray photoemission spectroscopic analysis in the present invention. In X-ray photoemission spectroscopic analysis also called X-ray photoelectron spectroscopy (XPS) or electron spectroscopy for chemical analysis (ESCA), the surface of a sample is irradiated with X-rays to generate photoelectrons, and the energy of the photoelectrons is measured to analyze the elements forming the sample and the state of electrons of the elements.

Specific examples of these analyzers include ESCALAB-200R made by VG Scientific Ltd.

In an exemplary procedure of measurement, the X-ray anode is a monochromatic Al and the output is 25 W (accelerating voltage: 15 kV, emission current: 1.7 mA). The energy resolution specified by the half width of Ag 3d5/2 peak from cleaned silver is adjusted at 0.8 to 0.5 eV.

A sample is measured at a binding energy in the range of −20 eV to 1200 eV and at a data input interval of 1.0 eV to detect contained elements. All the detected elements are subjected to narrow scanning at a data input interval of 0.2 eV to determine the photoelectron peak having a maximum intensity. The spectra of the elements are thereby obtained.

To eliminate a variation in calculated results of the contents among different analyzers or computers, the obtained spectra are transferred to COMMON DATA PROCESSING SYSTEM (preferably Ver. 5.0 or later) made by Surface Analysis Society of Japan, and are processed with this software to determine the contents of all the detected elements and the contents of trivalent cerium and quadrivalent cerium. Before the determination, the data on the detected elements is calibrated for Count Scale, and is subjected to five-point smoothing. The determination uses the peak area intensity (cps/eV) from which the background is removed.

The background processing is performed by a method by Shirley. For the Shirley method, see D. A. Shirley, Phys. Rev., B5, 4709 (1972). Furthermore, the content of the cerium element in different states can be determined using peak separation in the software. For the details of peak separation, see X-sen Kodenshi Bunkobunseki (X-rays Photoelectron Spectroscopy), edited by The Surface Science Society of Japan (Maruzen Company, Limited (1998/07)). For determination of the cerium contents in different states, see Eric Beche et al., Surf. Interface Anal. 2008; 40: 264-267 and Jacopo Rebellato et al., Applied Catalysis A: General 339 (2008) 108-120.

In the X-ray photoemission spectroscopic analysis, the content of trivalent cerium and that of quadrivalent cerium in the region ranging from the outermost layer to a depth of 10 nm of each particle are determined for every 1 nm ion etching of the particles from the outermost layer toward the center using ion beams. The average content of trivalent cerium and that of quadrivalent cerium are then determined.

[Particle Size Distribution Characteristics]

The abrasive particles according to the present invention preferably have a particle size $D_{50}$ (nm) within the range of 50 to 500 nm, which is determined from the cumulative particle size distribution curve of the abrasive particles.

More preferably, the particle size $D_{10}$ (nm) determined from the cumulative particle size distribution curve is within the range of 0.70 to 0.95 times the particle size $D_{50}$ (nm), and the particle size $D_{90}$ (nm) is within the range of 1.10 to 1.35 times the particle size $D_{50}$ (nm).

The cumulative particle size distribution curve according to the present invention can be prepared according to the following method.

The abrasive particles are observed with a scanning microscope to capture an SEM image, and 100 abrasive particles are selected at random. In these 100 abrasive particles, the diameter of a circle having an area equal to that of the image of each abrasive particle is determined as the particle size of the abrasive particle.

The particle sizes of the individual abrasive particles are plotted along the abscissa, and the cumulative particle number (integral curve) of the abrasive particles is plotted along the ordinate to prepare the cumulative particle size distribution curve on the particle sizes of the abrasive particles.

Figure 3:
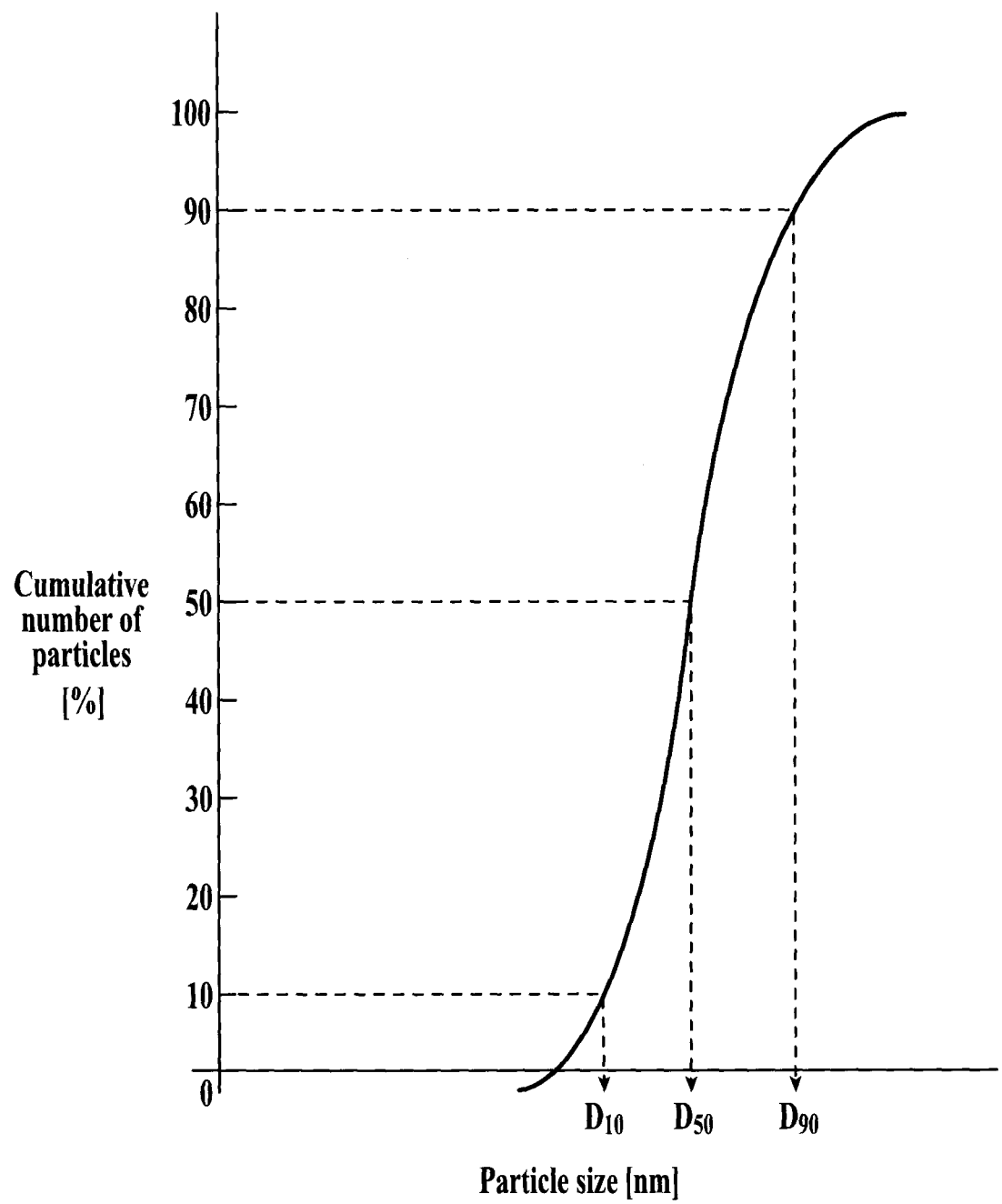
FIG. 3 is a graph illustrating an exemplary particle size cumulative distribution curve of the abrasive particles containing Ce(III) according to the present invention.

FIG. 3 is a graph illustrating an exemplary cumulative curve (integral curve of the particles) of the abrasive particles according to the present invention produced by the method described above.

In the cumulative curve illustrated in FIG. 3, 100 abrasive particles are accumulated in the ascending order of the particle size, and the cumulative number of abrasive particles is plotted against the particle size (nm) of the abrasive particle in the abscissa.

As shown in FIG. 3, the particle size corresponding to the cumulative number of particles of 50(%) is determined from the prepared cumulative curve, and is defined as $D_{50}$. Similarly, the particle size corresponding to the cumulative number of particles of 10(%) is determined as $D_{10}$, and the particle size corresponding to the cumulative number of particles of 90(%) is determined as $D_{90}$.

If the particle size $D_{10}$ or the particle size $D_{90}$ is within the range of a specific value to $D_{50}$ (median of the number of particles) specified above, the abrasive particles have a narrow distribution and high monodispersity.

The cumulative particle size distribution characteristics specified above can be achieved in the present invention through appropriate adjustment or control of the conditions, such as the time to mix the aqueous solution of a salt of a rare earth element with the aqueous solution of a precipitant under a high temperature environment, the reaction temperature, the reaction time, and the concentration of the aqueous solution of a salt of a rare earth element or the aqueous solution of a precipitant during mixing, in the step of preparing the abrasive particles.

[Composition of Abrasive Particle]

The average content of cerium contained in the abrasive particles according to the present invention is preferably 81 mol % or more of the total content of all the rare earth elements in the particles.

The cerium oxide abrasive particles prepared by a method of preparing homogeneous particles described below preferably have the average content of cerium specified above. In other words, the whole particles preferably satisfy the condition on the average value specified above. In the cerium oxide abrasive particles prepared by a method of preparing core-shell abrasive particles, the average content of cerium in the whole particles does not need to be 81 mol % or more. Preferably at least the shell portions of the particles have an average content of cerium of 81 mol % or more.

The composition of the cerium oxide abrasive particles prepared by the method of preparing homogeneous particles will now be described in detail.

The abrasive particles prepared by the method of preparing homogeneous particles according to the present invention preferably have a specific composition satisfying all of Requirements 1a to 3a:

Requirement 1a: the abrasive particles contain cerium and at least one element selected from the group consisting of yttrium, gadolinium, terbium, dysprosium, holmium, erbium, thulium, ytterbium, and lutetium.

Requirement 2a: the content of cerium in the abrasive particles is 81 mol % or more of the total content of all the rare earth elements in the particles.

Requirement 3a: the content of the at least one element selected from the group consisting of yttrium, gadolinium, terbium, dysprosium, holmium, erbium, thulium, ytterbium, and lutetium in the abrasive particles is 19 mol % or less of the total content of all the rare earth elements in the particles.

The content of each rare earth element contained in the abrasive particles can be determined by elemental analysis. For example, the abrasive particles (1 g) are dissolved in a mixed solution of an aqueous nitric acid solution (10 ml) and a hydrogen peroxide solution (1.0 ml), and the mixed solution is subjected to elemental analysis with ICP atomic emission spectrometer (ICP-AES) made by SII NanoTechnology Inc. From the contents of the rare earth elements in the abrasive particles, the compositional ratio (mol %) thereof can be determined.

The compositional distribution in the abrasive particles can be determined through elemental analysis of the cross section of an abrasive particle. For example, the abrasive particle is cut with Focused Ion Beam (FB-2000A) made by Hitachi High-Technologies Corporation to obtain a cross section including a central portion of the particle. The cross section is subjected to elemental analysis with a scanning transmission electron microscope STEM-EDX (HD-2000) made by Hitachi High-Technologies Corporation to determine the distributions of the rare earth elements contained in the abrasive particle.

The abrasive particles according to the present invention have a higher polishing rate as the content of cerium increases.

The polishing rate in the present invention can be measured by polishing the surface of a workpiece on a polisher with a polishing cloth while a slurry of an abrasive material prepared by dispersing a powdery abrasive material containing the abrasive particles in a solvent, such as water, is being fed to the surface of the workpiece.

The polishing rate can be measured, for example, by polishing the target surface while the slurry of the abrasive material is being circulated to the polisher. The thicknesses of the workpiece before and after polishing are measured with a digital length measuring system Nikon Digimicro (MF501). A polishing depth (μm) per minute can be calculated from the difference in thickness, and can be defined as the polishing rate. Details of the method of measuring the polishing rate will be described later in Examples according to FIG. 10.

The abrasive particles according to the present invention preferably have a specific composition satisfying all of Requirements 1b to 3b:

Requirement 1b: the abrasive particles contain cerium and at least one element selected from the group consisting of yttrium, gadolinium, terbium, dysprosium, holmium, erbium, thulium, ytterbium, and lutetium.

Requirement 2b: the content of cerium in the abrasive particles is 90 mol % or more of the total content of all the rare earth elements in the particles.

Requirement 3b: the content of the at least one element selected from the group consisting of yttrium, gadolinium, terbium, dysprosium, holmium, erbium, thulium, ytterbium, and lutetium in the abrasive particles is 10 mol % or less of the total content of all the rare earth elements in the particles.

If all of the requirements are satisfied, the content of the at least one element selected from the group consisting of yttrium, gadolinium, terbium, dysprosium, holmium, erbium, thulium, ytterbium, and lutetium, which is contained with cerium, can be decreased, producing spherical abrasive particles at reduced production cost.

Furthermore, the abrasive particles according to the present invention preferably have a spherical shape and contain cerium within the range of 95 to 100 mol % of the total content of all the rare earth elements in the particles.

If the content of cerium contained in the spherical abrasive particles is within the range of 95 to 100 mol % of the total content of all the rare earth elements in the particles, an abrasive material comprising such spherical abrasive particles can achieve a significantly high polishing rate due to a high proportion of cerium.

[Half Width of Main Peak in Powder X Ray Diffraction Pattern]

The cerium oxide abrasive particles contained in the abrasive material according to the present invention preferably have a half width of the main peak within the range of 0.17 to 0.25° in the powder X ray diffraction pattern. More preferably, the cerium oxide abrasive particles have a spherical shape having an average aspect ratio within the range of 1.00 to 1.02.

The hardness of such spherical abrasive particles in the abrasive material and scratches generated have not been quantitatively optimized. The present inventors, who have conducted research on this optimization, have found that the number of scratches generated by such abrasive particles is smaller than that generated by traditional abrasive particles even if the abrasive particles have a higher hardness than that traditionally used. The present inventors infer that this reduction in scratches is significantly due to the shape of the abrasive particles.

Throughout the specification, the scratches indicate fine marks generated on the surface of a workpiece during polishing. Such fine scratches present on the surface of a glass substrate, in turn, may appear as defects on the surface of a product, such as a magnetic disk, if the magnetic disk includes the glass substrate with scratches and a magnetic film disposed on the glass substrate.

Figure 4:
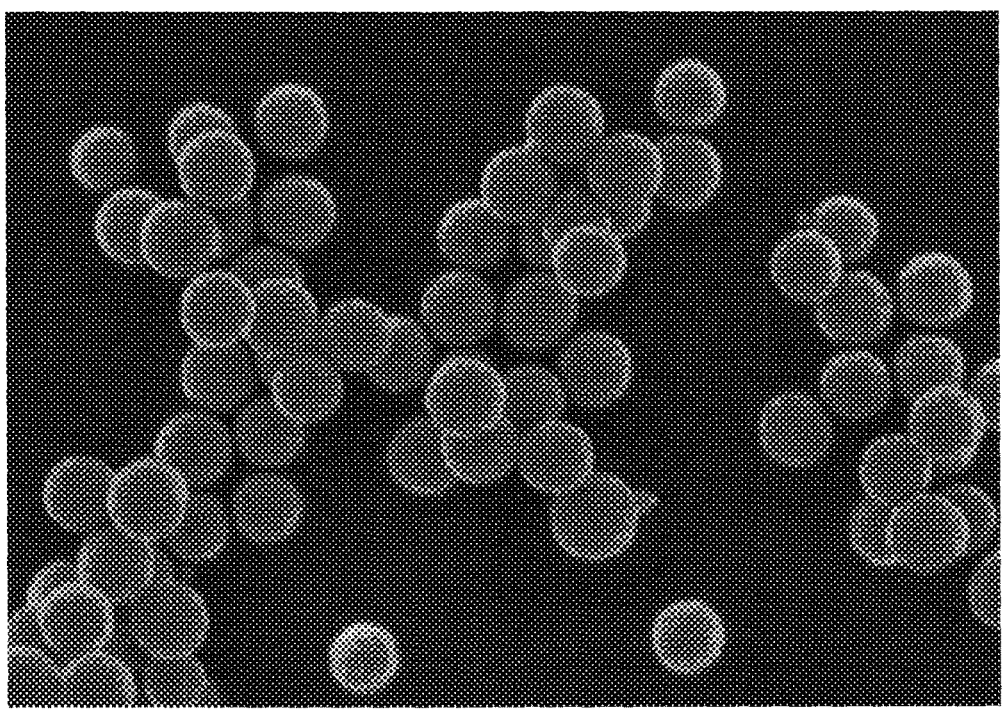
FIG. 4 is a scanning microscopic photograph, illustrating exemplary cerium oxide abrasive particles according to the present invention having a half width of the powder X ray diffraction pattern at a specific value.

The abrasive particles according to the present invention have a spherical shape because the half width of the main peak in the powder X ray diffraction pattern of the abrasive particles is within the range specified above. FIG. 4 is an electron microscopic photograph, illustrating exemplary cerium oxide particles according to the present invention having a half width of the main peak within the range of 0.17 to 0.25° in the powder X ray diffraction pattern according to the present invention, for example. Such spherical abrasive particles shown in FIG. 4 have substantially homogenous edges, and an abrasive material comprising the spherical abrasive particles can uniformly polish workpieces while barely forming scratch.

<Powder X Ray Diffraction Pattern of Abrasive Particles>

The half width of the main peak is within the range of 0.17 to 0.25° in the powder X ray diffraction pattern of the abrasive particles according to the present invention. The half width of the main peak in the powder X ray diffraction pattern can be regarded as an index of the hardness of the abrasive particles. A narrower half width indicates a smaller amount of lattice defects in the crystals of the abrasive particles. Although traditional abrasive particles having high hardness readily form scratch on the surfaces of workpieces during polishing, the abrasive particles according to the present invention can polish the surfaces of workpieces while barely forming scratch.

The powder X ray diffraction pattern can be obtained with a powder X ray diffractometer MiniFlexII (made by Rigaku Corporation), for example.

<<Method of Preparing Abrasive Particles>>

The method of preparing abrasive materials will now be described.

The methods of preparing abrasive particles according to the present invention comprises a step of preparing cerium oxide abrasive particles by a synthetic method using an aqueous solution of a salt of a rare earth element and a precipitant, and as described above, are classified mainly into the method of preparing homogeneous particles and the method of preparing core-shell abrasive particles.

The method of preparing cerium oxide abrasive particles by the method of preparing homogeneous particles and the method of preparing core-shell abrasive particles will now be described.

[Method of Preparing Homogeneous Particles]

Figure 5:
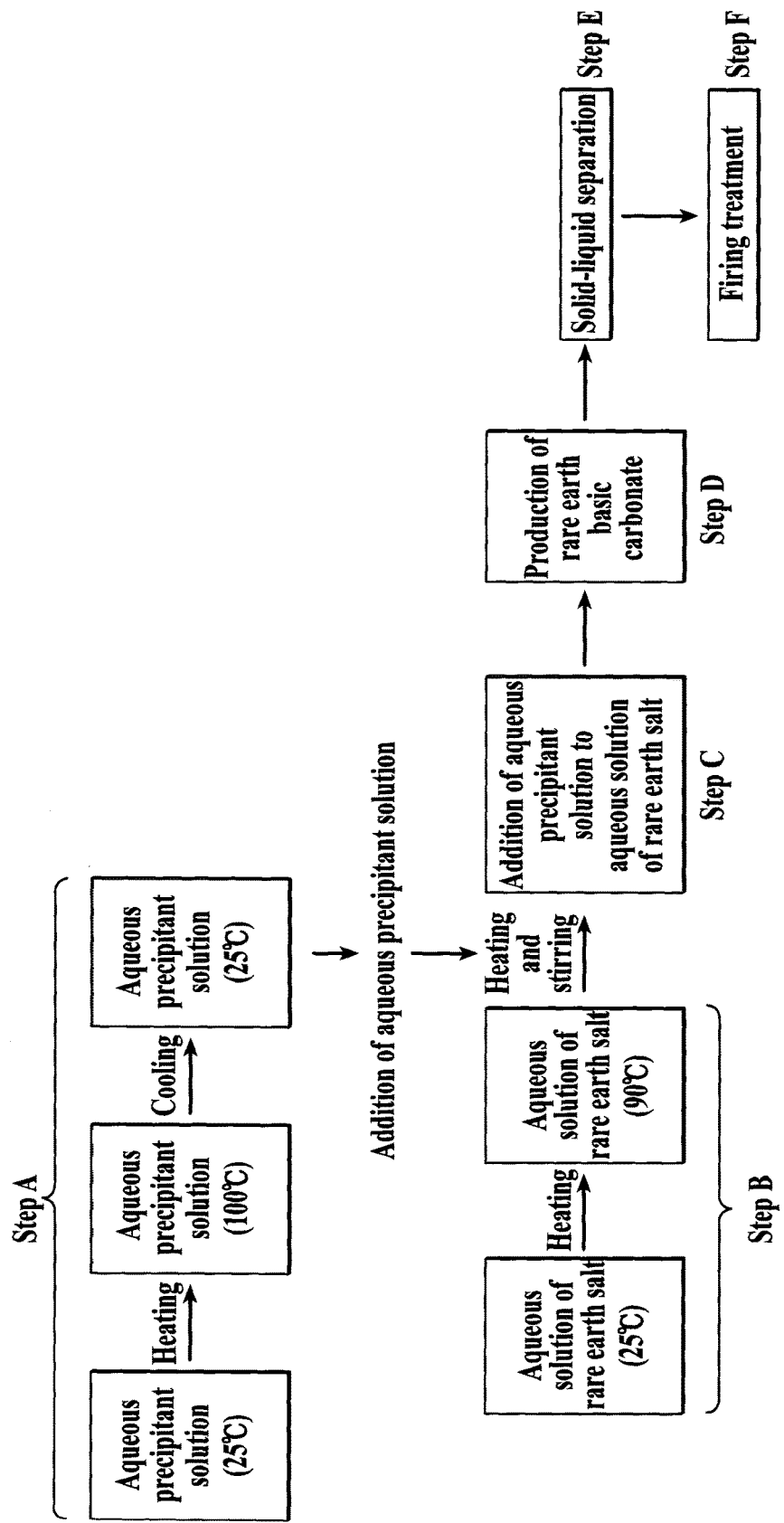
FIG. 5 is a schematic process chart illustrating an exemplary process of producing cerium oxide abrasive particles having a homogeneous composition by a method of preparing homogeneous particles.

FIG. 5 is a schematic process chart illustrating an exemplary process of producing cerium oxide abrasive particles by the method of preparing homogeneous particles.

The process of producing the cerium oxide abrasive particles in the present invention by the method of preparing homogeneous particles mainly comprises six steps shown in FIG. 5 (step A: preparation of aqueous precipitant solution, step B: preparation of aqueous solution of salt of rare earth element, step C: addition of aqueous precipitant solution (formation of nuclear particles), step D: heating of solution with stirring (formation of particles), step E: solid liquid separation, and step F: firing).

These steps will be sequentially described.

(Step A: Preparation of Aqueous Precipitant Solution)

In step A in FIG. 5 (preparation of aqueous precipitant solution), an aqueous solution of a precipitant in a predetermined concentration is prepared under room temperature, and is heated in a sealed container to prepare an aqueous solution of a precipitant to be added.

For example, an aqueous solution (0.5 L) of 5.0 mol/L precipitant is prepared, and is heated in a sealed container at 100° C. for six hours. The solution is then cooled to 20° C., and is used as the aqueous solution of a precipitant.

Heating the aqueous solution of a precipitant in the sealed container can accelerate hydrolysis of the precipitant while the solvent is trapped. A preferred precipitant is urea or a urea compound, which can stably feed carbon dioxide and ammonia through the hydrolysis reaction.

Besides urea, other examples of usable precipitants include salts of urea (such as nitrates and hydrochlorides), N,N'-dimethylacetylurea, N,N'-dibenzoylurea, benzenesulfonylurea, p-toluenesulfonylurea, trimethylurea, tetraethylurea, tetramethylurea, triphenylurea, tetraphenylurea, N-benzoylurea, methylisourea, ethylisourea, and ammonium hydrogen carbonate. Although a representative example of forming a rare earth element basic carbonate with an aqueous urea solution will be described in Examples below, it should be noted that this is mere examples and should not be construed to limit the present invention.

(Step B: Preparing Aqueous Solution of Salt of Rare Earth Element)

In step B in FIG. 5 (preparation of aqueous solution of salt of rare earth element), an aqueous solution of a salt of a rare earth element is prepared. The cerium content in the solution is 81 mol % or more of the total content of all the rare earth elements. The resulting aqueous solution of a salt of a rare earth element is preferably heated to 90° C.

Specifically, a preferred method prepares an aqueous solution of a salt of a rare earth element which satisfies all of the requirements specified in Requirements 1a to 3a or all of the requirements specified in Requirements 1b to 3b or contains cerium within the range of 95 to 100 mol % of the total content of all the rare earth elements in the particles, as described above.

The ion concentration is preferably set within the range of 0.001 mol/L to 0.1 mol/L in the aqueous solution of a salt of a rare earth element according to the present invention containing 81 mol % or more cerium to the total content of all the rare earth elements in the particle and at least one element selected from the group consisting of yttrium, gadolinium, terbium, dysprosium, holmium, erbium, thulium, ytterbium, and lutetium or the aqueous solution of a salt of a rare earth element according to the present invention containing 95 to 100 mol % cerium to the total content of all the rare earth elements in the particles.

The concentration of the aqueous solution of a precipitant, such as a urea aqueous solution, is preferably set within the range of 5 to 50 times the ion concentration of the aqueous solution of a salt of a rare earth element.

Monodispersive spherical abrasive particles can be prepared, as described above, through control of the ion concentration in the aqueous solution of a salt of a rare earth element according to the present invention and the ion concentration in the aqueous solution of a precipitant (such as urea) within the ranges above, the aqueous solution of a salt of a rare earth element containing 81 mol % or more cerium to the total content of all the rare earth elements in the particles and at least one element selected from the group consisting of yttrium, gadolinium, terbium, dysprosium, holmium, erbium, thulium, ytterbium, and lutetium, or containing 95 to 100 mol % cerium to the total content of all the rare earth elements in the particles.

Salts of these elements can be used in preparation of the aqueous solution of a salt of a rare earth element according to the present invention, and examples of the salts include nitrates, hydrochloride, and sulfates of these elements. Preferred are use of nitrates, such as cerium nitrate, yttrium nitrate, gadolinium nitrate, terbium nitrate, dysprosium nitrate, holmium nitrate, erbium nitrate, thulium nitrate, ytterbium nitrate, and lutetium nitrate. Use of these salts can produce an abrasive material containing low levels of impurities.

(Step C: Addition of Aqueous Precipitant Solution)

With reference to FIG. 5, the aqueous solution of a precipitant prepared in step A (preparation of aqueous precipitant solution) is then added to the aqueous solution of a salt of a rare earth element heated in step B (preparation of aqueous solution of salt of rare earth element), and is heated with heated with stirring to prepare a mixed solution.

Mixing of the aqueous solution of a precipitant with the aqueous solution of a salt of a rare earth element at high temperature allows carbon dioxide and ammonia contained in the aqueous solution of a precipitant to act on the aqueous solution of a salt of a rare earth element to generate nuclei for the abrasive particles.

A higher rate of addition of the aqueous solution of a precipitant is preferred to enhance the monodispersibility of the particles. Specifically, the rate of addition of the aqueous solution of a precipitant is preferably 0.5 L/min or more, particularly preferably 1.0 L/min or more. It is believed that at a higher rate of addition of the aqueous solution of a precipitant, the nuclei of the abrasive particles generated by the aqueous solution of a precipitant can grow into spheres.

(Step D: Heating of Solution with Stirring (Formation of Particles))

In the next step, the mixed solution containing the nuclear particles for the abrasive material generated in step C is aged with heated with stirring at a predetermined temperature for a predetermined time to grow the nuclear particles for the abrasive material. A precursor for the abrasive particles, i.e., a basic carbonate of a rare earth element is prepared.

The heating temperature in step D is preferably 80° C. or more, particularly preferably 90° C. or more. The stirring time is preferably one hour or more and ten hours or less, particularly preferably one hour or more and three hours or less. The heating temperature and the stirring time can be appropriately adjusted according to the target particle size.

Any stirrer having sufficient stirring efficiency can be used. Preferred is use of a stirrer of a rotor-stator type to enhance the stirring efficiency.

The particle sizes $D_{50}$, $D_{10}$, and $D_{90}$ in the cumulative particle size distribution curve can be controlled within a desired range specified in the present invention through adjustment of the conditions in steps C and D in the present invention.

For example, in mixing of the aqueous solution of a precipitant with the aqueous solution of a salt of a rare earth element, a short mixing time increases the number of nuclear particles generated and thus the final number of particles and consequently reduces the final particle size, so that the particle sizes $D_{50}$, $D_{10}$, and $D_{90}$ reduce. Conversely, a long mixing time decreases the number of nuclear particles generated and thus facilitates growth of large particles.

An increase in the heating time (aging time) in step D after formation of the nuclear particles promotes the growth of particles into a larger precursor for the final abrasive particles. An increase in the reaction temperature also promotes the growth of particles to increase the particle size $D_{50}$.

The particle size $D_{90}$ increases as the concentration of the aqueous solution of a salt of a rare earth element increases in step C (addition of aqueous precipitant solution). The particle size $D_{10}$ increases as the concentration of the aqueous solution of a precipitant added to the aqueous solution of a salt of a rare earth element decreases in step C (addition of aqueous precipitant solution).

An increase in the heating time (aging time) in step D after the formation of the nuclear particles promotes the dissolution of nanoparticles and thus Ostwald ripening contributing to the growth of the precursor for the abrasive particles, enhancing the monodispersity of the particles and the sphericity (aspect ratio) at the same time.

(Step E: Solid Liquid Separation)

After heating with stirring, the resulting precipitate (nanoparticulate precursor for the abrasive material, rare earth element basic carbonate) is separated from the reaction solution with a solid liquid separator. The solid liquid separation is performed by any standard method. For example, the abrasive particle precursor is filtrated through a solid liquid separation filter to separate the precipitate from the reaction solution.

(Step F: Firing)

In step F (firing), the precursor for the abrasive particles prepared in step E (solid liquid separation) is fired in the air or an oxidizing atmosphere at 450° C. or more. The fired precursor for the abrasive particles is oxidized to prepare abrasive particles containing cerium oxide. The aspect ratio of the final abrasive particles in the present invention can be controlled within the range of 450 to 900° C. through adjustment of the firing temperature in step F (firing).

Before the firing step, the precursor may be washed with water or alcohol and then dried when necessary.

The abrasive particles prepared through the firing step is cooled to be stabilized, and can be recovered as an abrasive material containing the abrasive particles.

The abrasive material produced by the method according to the present invention contains spherical abrasive particles, but not substantially anisotropically grown abrasive particles.

The abrasive material according to the present invention contains the abrasive particles prepared by the method in an amount of preferably 50 mass % or more, more preferably 70 mass % or more, particularly preferably 90 mass % or more. Such an abrasive material can reduce the surface roughnesses of workpieces polished.

[Preparation of Core-Shell Abrasive Particles]

The method of preparing core-shell abrasive particles will now be described.

Figure 6:
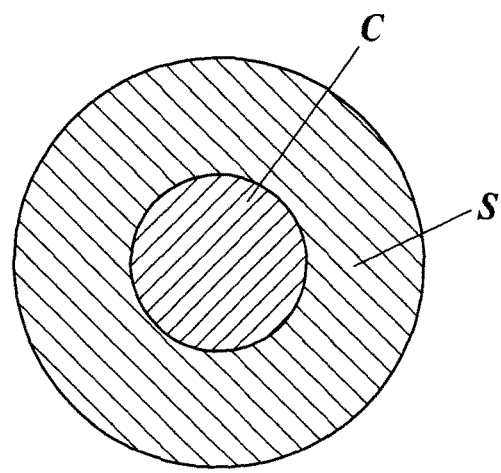
FIG. 6 is a schematic view illustrating the structure of a core-shell abrasive particle.

A cerium oxide abrasive particle illustrated in FIG. 6 is composed of a core C and a shell S.

Use of core-shell abrasive particles in the present invention is preferred because such abrasive particles can reduce the amount of a valuable resource cerium to be used, can concentrate cerium in the core region governing the polishing rate, and can control the average content of trivalent cerium within a desired range to the total cerium content in the surface region ranging from the outermost layer of each cerium oxide abrasive particle to a depth of 10 nm toward the center of the particle specified in the present invention.

Figure 7:
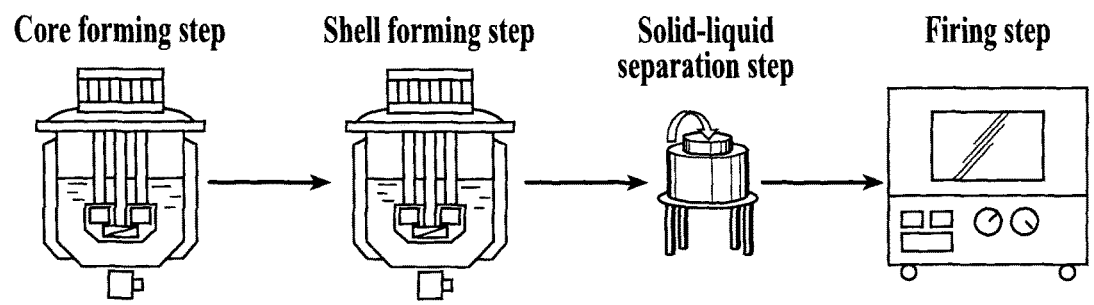
FIG. 7 is a schematic process chart illustrating an exemplary process of producing core-shell cerium oxide abrasive particles by a method of preparing core-shell abrasive particles.

The core-shell abrasive particles having a structure illustrated in FIG. 6 in the present invention are preferably prepared by a method illustrated in FIG. 7, comprising four steps: formation of cores, formation of shells, solid liquid separation, and firing.

FIG. 7 is a schematic process chart illustrating an exemplary process of producing cerium oxide abrasive particles by the method of preparing core-shell abrasive particles.

(Formation of Cores)

In a preferred step of forming cores, a salt of at least one element selected from the group consisting of yttrium (Y), titanium (Ti), strontium (Sr), barium (Ba), samarium (Sm), europium (Eu), gadolinium (Gd), and terbium (Tb) is formed, and cores C of the abrasive particle precursor mainly composed of the salt are formed. The cores C may be formed with the salt in combination with a salt of at least one element selected from the group consisting of Ce, Al, Sc, V, Cr, Mn, Fe, Co, Ni, Cu, Zn, Ga, Ge, Zr, In, Sn, Dy, Ho, Er, Tm, Yb, Lu, W, Bi, Th, and alkaline earth metals.

In a specific step of forming cores, for example, a salt of yttrium (Y) and a precipitant are dissolved in water to prepare a solution of a predetermined concentration. The aqueous solution is heated with stirring at 80° C. or more to produce seed crystals for the core C. In the step of forming cores, a solution of the salt of yttrium is added to the aqueous solution, and is heated with stirring at 80° C. or more. This operation in the step forms water-insoluble basic carbonate, such as yttrium basic carbonate ($Y(OH)CO_3$ or $Y(OH)CO_3.xH_2O$, where x=1), and grows yttrium basic carbonate over the seed crystals to form cores C of the abrasive particle precursor. The solution at the start of heating is referred to as reaction solution in the following description.

In the step of forming cores, the salt of the at least one element selected from the group consisting of yttrium (Y), titanium (Ti), strontium (Sr), barium (Ba), samarium (Sm), europium (Eu), gadolinium (Gd), and terbium (Tb) is dissolved in water optionally in combination with the salt of the at least one element selected from the group consisting of Ce, Al, Sc, V, Cr, Mn, Fe, Co, Ni, Cu, Zn, Ga, Ge, Zr, In, Sn, Dy, Ho, Er, Tm, Yb, Lu, W, Bi, Th, and alkaline earth metals. Examples of these salts include nitrates, hydrochlorides, and sulfates. Preferred are nitrates (such as yttrium nitrate, titanium nitrate, strontium nitrate, barium nitrate, samarium nitrate, europium nitrate, gadolinium nitrate, terbium nitrate) because the product contains low levels of impurities.

The precipitant can be any alkali compound which generates a basic carbonate through heating a mixture of the alkali compound with the salt of the element. Preferred precipitants are urea compounds, ammonium carbonate, and ammonium hydrogen carbonate.

The urea compounds can be the same compounds used in the method of preparing homogeneous particles.

Generation of a water-insoluble basic carbonate, such as a basic carbonate of yttrium, enables the precipitate to be monodispersed. Furthermore, generation of the water-insoluble basic carbonate forms basic carbonate of cerium in the step of forming shells described later, forming shells having a continuous layer structure composed of the basic carbonate of cerium.

In Examples below, the aqueous solution prepared from the salt of yttrium added to the reaction solution in the step of forming cores and the step of forming shells indicates an aqueous yttrium nitrate solution prepared by dissolving yttrium nitrate in water. Although an example using urea as the urea compound will be described, but it should be noted that this is mere example and is not construed to limit the present invention.

The rate of addition of the aqueous solution containing a salt of yttrium, for example, is preferably 0.003 mol/L to 5.5 mol/L per minute in the step of forming a core. Preferably, the aqueous solution is added to the reaction solution while being heated with stirring at 80° C. or more. A rate within this range readily produces highly monodispersive spherical abrasive particles. A heating temperature of 80° C. or more during heating with stirring accelerates the decomposition of urea added. The concentration of urea added is preferably 5 to 50 times the yttrium ion concentration. An ion concentration of yttrium in the aqueous solution and the urea concentration within these ranges can produce monodispersive spherical abrasive particles.

Any stirrer having sufficient stirring efficiency can be used in heating with stirring. Preferred is use of an axial-flow stirrer of a rotor-stator type to enhance stirring efficiency.

(Formation of Shells)

In a preferred step of forming shells, a mixed solution of the aqueous solution of the salt of at least one element selected from the group consisting of the yttrium (Y), titanium (Ti), strontium (Sr), barium (Ba), samarium (Sm), europium (Eu), gadolinium (Gd), and terbium (Tb) and the aqueous solution of a salt of cerium (Ce) is added to the reaction solution of the basic carbonate of at least one element selected from the eight elements prepared in the step of forming a core at a predetermined rate for a predetermined time. Specifically, use of yttrium as the at least one element selected from the eight elements forms shells S for an abrasive particle precursor containing a basic carbonate of yttrium, such as yttrium basic carbonate ($Y(OH)CO_3$ or $Y(OH)CO_3.xH_2O$, where x=1) and a basic carbonate of cerium, such as cerium basic carbonate ($Ce(OH)CO_3$ or $Ce(OH)CO_3.xH_2O$, where x=1) on the outer surfaces of the cores 1.

The shells S may be formed with these salts in combination with a salt of at least one element selected from the group consisting of Al, Sc, V, Cr, Mn, Fe, Co, Ni, Cu, Zn, Ga, Ge, Zr, In, Sn, Dy, Ho, Er, Tm, Yb, Lu, W, Bi, Th, and alkaline earth metals.

The salt of cerium used in preparation of the aqueous solution is preferably nitrates because the product contains low levels of impurities; for this reason, cerium nitrate is used in the above example. Alternatively, the salts of cerium may be hydrochlorides and sulfates other than nitrates.

A preferred rate of addition of the aqueous solution in the step of forming a shell is 0.003 mol/L to 5.5 mol/L per minute. A rate within this range readily produces highly monodispersive spherical abrasive particles.

The proportion of cerium in the aqueous solution is preferably 90 mol % or less. If the aqueous solution containing more than 90 mol % cerium is added over the same time as that in addition of the aqueous solution containing 90 mol % or less cerium, the resulting abrasive particles are not monodispersive and aggregate into flakes.

The reaction solution is preferably heated with stirring at 80° C. or more while the aqueous solution is being added at the addition rate. If the reaction solution is heated with stirring at 80° C. or more, urea added in the step of forming a core readily decomposes.

(Solid Liquid Separation)

In the step of solid liquid separation, the core-shell inorganic particle precursor having the shell 2 formed on the surface thereof in the step of forming a shell is separated from the reaction solution through solid liquid separation. The resulting core-shell inorganic particle precursor may be dried in the step of solid liquid separation when necessary, and may be fed to the firing step.

(Firing)

In the firing step, the core-shell inorganic particle precursor prepared in the step of solid liquid separation is fired in the air or in an oxidizing atmosphere at 450 to 900° C. for 1 to 5 hours. Carbon dioxide is removed from the core-shell inorganic particle precursor during firing to oxidize the basic carbonate, resulting in the target core-shell inorganic particles.

A specific firing apparatus for firing the core-shell inorganic particle precursor is preferably a known roller hearth kiln or a rotary kiln. Preferably, such an apparatus uniformly heats the core-shell inorganic particle precursor contained in the abrasive material.

A typical roller hearth kiln includes a plurality of rollers disposed in a furnace. The roller hearth kiln transfers the raw material between the rollers. The region inside the furnace can be divided into zones according to the temperatures of individual steps, such as pre-burning, firing, and cooling. A typical rotary kiln has a substantially cylindrical shape, for example. The rotary kiln gradually transfers the raw material while slowly circulating the raw material in the kiln.

<pH of Reaction Solution>

In the method for producing the abrasive material according to the present invention, the pH at the reaction temperature of the reaction solution is preferably controlled within the range of 4.5 to 7.0 in step 2 (step of heating the reaction solution to prepare an abrasive particle precursor, such as steps C and D in FIG. 5) to produce abrasive particles having high sphericity suitable for precise polishing. Furthermore, urea is preferably added to the reaction solution as a pH adjuster for the reaction solution to prepare abrasive particles having enhanced sphericity. Furthermore, an aqueous acidic or alkaline solution is preferably added to the reaction solution as pH adjusters for the reaction solution. The pH at the reaction temperature of the reaction solution is preferably controlled within the range of 5.0 to 6.5 in the step of forming an abrasive particle precursor.

Figure 8:
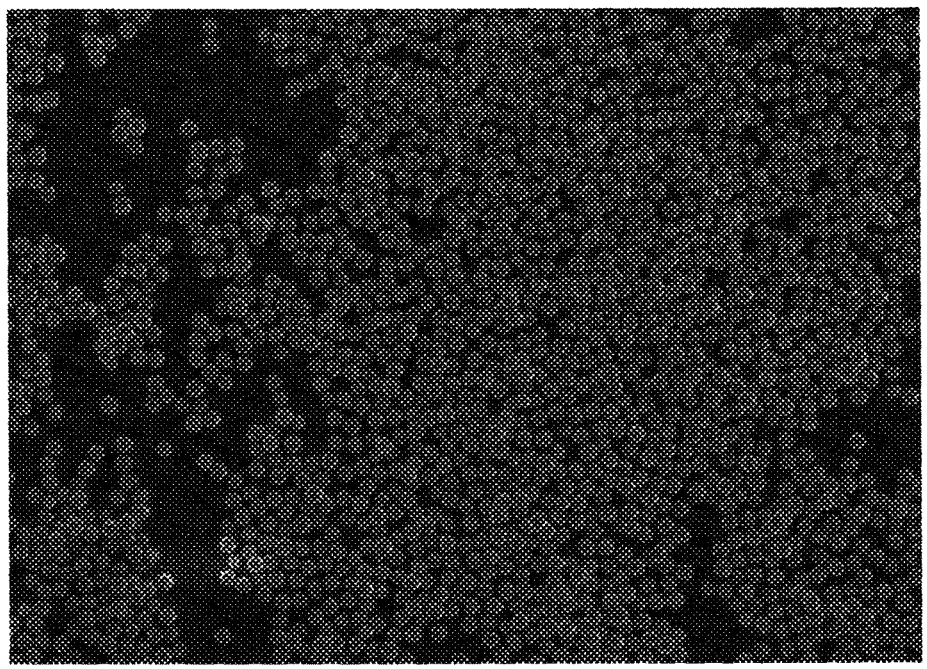
FIG. 8 is an exemplary scanning microscopic photograph showing the abrasive particles prepared by a method using a reaction solution having a specific pH.
Figure 9:
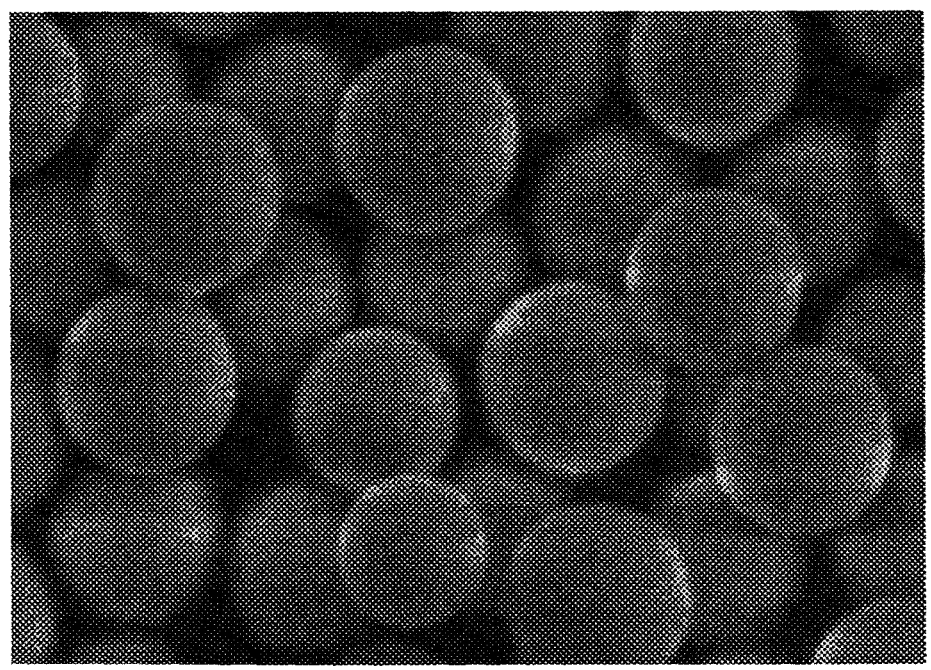
FIG. 9 is an exemplary scanning microscopic photograph showing the abrasive particles prepared by a method using a reaction solution having a specific pH.

The abrasive material comprising abrasive particles prepared by the method and having high sphericity is suitable for precise polishing. The abrasive material has a high polishing rate and thus high productivity. FIG. 8 is a scanning microscopic photograph (magnification: 3000×) of the abrasive particles prepared by the method above. FIG. 9 is an enlarged image (magnification: 30000×) of the SEM image in FIG. 8. These SEM images show that the abrasive particles have a spherical shape and have high monodispersity.

The present inventors have found that the pH of the reaction solution during formation of the abrasive particle precursor containing cerium affects the sphericity of the abrasive particles. Although the action and the mechanism are not clarified yet, the present inventors believe that this advantageous effect is attained by a variation in pH of the reaction solution during formation of the particles as a result of pyrolysis of urea to change the state of charge on the surface of the resulting abrasive particle precursor, so that the precursor readily aggregates.

A variation in pH of the reaction solution during formation of particles is also caused by a salt of a rare earth element used as a raw material as well as by pyrolysis of urea. Prevention of such a change in pH and control of the pH within a predetermined range can stably produce a spherical abrasive particle precursor having cerium on the surface thereof in a high concentration.

At a pH of 4.5 or more, the surfaces of the resulting abrasive particles are not dissolved, preventing aggregation of particles or formation of amorphous particles. At a pH of 7.0 or less, a large amount of minus charges preferably concentrates on the surfaces of the particles, preventing aggregation of particles.

Preferably, the pH at the reaction temperature of the reaction solution is controlled within the range of 4.5 to 7.0, more preferably 5.0 to 6.5.

Although the pH does not significantly vary in the initial stage of the reaction, the pH varies more significantly as the reaction progresses. Accordingly, it is particularly important to control the pH in the later stage of the reaction.

The pH can be controlled with a typical acid or alkali. Examples of the alkali include inorganic alkalis, such as potassium hydroxide and sodium hydroxide, and organic alkalis, such as ammonia and urea. Examples of the acid include inorganic acids, such as sulfuric acid, nitric acid, and hydrochloric acid, and organic acids, such as formic acid and acetic acid.

Urea undergoes different decomposition reactions according to the pH of the solution; urea consumes $H^+$ in an acidic solution to react with $H^+$ whereas urea consumes $OH^-$ in an alkaline solution to react with $OH^-$. Accordingly, urea can be used as a pH adjuster.

Among these, nitric acid, ammonia, or urea is preferably added to the reaction solution as a pH adjuster. In addition, urea decomposes to generate carbonate ions. Accordingly, urea is more preferred because it can also be used in the reaction to form particles.

The concentration of the pH adjuster is preferably within the range of 0.01 to 10 mol/L. The rate of addition of the pH adjuster is preferably within the range of 0.01 to 10 ml/min.

Throughout the specification, the reaction solution indicates a mixed solution of the aqueous urea solution and the aqueous solution of a salt of a rare earth element.

The reaction solution should have a temperature at which the ureas added can be hydrolyzed to generate carbon dioxide. A preferred temperature is within the range of 75° C. to 100° C. More preferably, the temperature is preferably 80° C. or more, particularly preferably 90° C. or more. The stirring time is preferably one hour or more and ten hours or less, particularly preferably one hour or more and three hours or less. The heating temperature and the stirring time can be appropriately controlled according to the target particle size.

Any stirrer having sufficient stirring efficiency can be used. Preferred is use of a stirrer of a rotor-stator type to enhance the stirring efficiency.

<Firing Step in Preparation of Cerium Oxide Abrasive Particles Having Half Width of Main Peak within the Range of 0.17 To 0.25°>

In the method for producing a cerium oxide abrasive material comprising cerium oxide abrasive particles having a half width of the main peak within the range of 0.17 to 0.25° in the powder X ray diffraction pattern, preferably the abrasive particles are prepared by firing at least the cerium oxide particle precursor composed of cerium oxide precipitated in a solution, and the firing treatment is performed at a firing temperature within the range of 700 to 1000° C. Furthermore, a firing apparatus for firing the cerium oxide particle precursor in the firing step is preferably a roller hearth kiln or a rotary kiln.

The firing temperature in this range is preferred because a firing temperature of 700° C. or more can produce abrasive particles having a sufficiently high polishing rate and a firing temperature of 1000° C. or less can readily produce spherical abrasive particles.

A specific firing apparatus for firing the cerium oxide particle precursor is preferably a known roller hearth kiln or a rotary kiln. Preferably, such an apparatus uniformly heats the cerium oxide particle precursor to attain cerium oxide particles having a uniform structure.

A typical roller hearth kiln includes a plurality of rollers disposed in a furnace. The roller hearth kiln transfers the raw material between the rollers. The region inside the furnace can be divided into sections according to the temperatures of individual steps, such as pre-burning, firing, and cooling. A typical rotary kiln has a substantially cylindrical shape, for example. The rotary kiln gradually transfers the raw material while slowly circulating the raw material in the kiln.

The cerium oxide particle precursor can also be pre-burned after the step of performing solid liquid separation and the firing step. Specifically, pre-burning is preferably performed at a temperature within the range of 300 to 490° C. for one to five hours. It is believed that pre-burning performed on the conditions attains a cerium oxide abrasive material having high durability against the pressure during polishing. In particular, pre-burning is preferably at a temperature within the range of 300 to 400° C. for two to three hours.

Pre-burning can be performed with a known roller hearth kiln or a rotary kiln as in the firing step.

Furthermore, the temperature in the firing step is preferably increased at a rate within the range of 20 to 50° C./min. It is believed that this operation stably grows crystallites containing a large amount of cerium.

After the firing step, the temperature is preferably lowered from 700° C. to room temperature (25° C.) at a rate within the range of 1 to 20° C./min. It is believed that this operation can prevent generation of fine distortions in crystals to form abrasive particles having substantially no irregularities on the outermost surfaces.

<<Polishing Method>>

A polishing method will be described with a glass substrate for an information recoding disk.

1. Preparation of Slurry of Abrasive Material

A powdery abrasive material containing the abrasive particles is added to a solvent, such as water, to prepare a slurry of the abrasive material. A dispersant is added to the slurry of the abrasive material to prevent aggregation. The slurry is always stirred with a stirrer to keep the dispersed state. The slurry of the abrasive material is circulated in a polisher with a feeding pump.

2. Polishing

A glass substrate is brought into contact with upper and lower disks of the polisher, each disk provided with a polishing pad (polishing cloth) on one surface. While the slurry of the abrasive material is being fed to the contact surface, the glass substrate and the disks can be relatively moved under increased pressure to polish the substrate.

EXAMPLES

The method for producing an abrasive material will now be described in detail by way of non-limiting Examples and Comparative Examples. In Examples, "parts" and "%" indicate "parts by mass" and "mass %", respectively, unless otherwise specified.

Example 1

An exemplary abrasive material according to a preferred embodiment of the present invention comprising cerium oxide abrasive particles having an average content of trivalent cerium within the range of 5 to 40 mol % of the total cerium content in the surface region ranging from the outermost layer of each cerium oxide abrasive particle to a depth of 10 nm toward the center of the particle will be described in Examples 1 and 2 below.

<<Preparation of Abrasive Particles>>

[Preparation of Abrasive Particle 1: Core-Shell Abrasive Particles]

Abrasive particle 1 of a core-shell type was prepared according to the following steps (1) to (5):

(1: Formation of Seed Crystals)

An aqueous solution of 0.02 mol/L yttrium(III) nitrate (hereinafter simply referred to as aqueous yttrium nitrate solution) (2 L) was prepared, and urea was added to the aqueous solution such that the concentration was 0.60 mol/L. A reaction solution was thereby prepared. This reaction solution was heated at 90° C. with stirring to form seed crystals.

(2: Formation of Core C)

An aqueous solution of 1.6 mol/L yttrium nitrate was added to the reaction solution containing seed crystals prepared in (1: Formation of seed crystals) at a rate of 1 mL/min for 65 minutes while being heated with stirring at 90° C. Core C composed of basic carbonate was thereby formed.

(3: Formation of Shell Layers)

A mixed solution of an aqueous solution of 0.48 mol/L yttrium nitrate and an aqueous solution of 1.12 mol/L cerium(III) nitrate (hereinafter simply referred to as aqueous cerium nitrate solution) was added to the reaction solution containing core C prepared in (2: Formation of cores C) at a rate of 1 mL/min for 65 minutes while being heated with stirring at 90° C. Shell S was thereby formed over the surface of core C to prepare a core-shell inorganic particle precursor. The content of cerium in shell S was 70 mol %.

(4: Solid Liquid Separation)

The precipitated core-shell inorganic particle precursor was separated from the reaction solution prepared in (3: Formation of shell layers) through a membrane filter.

(5: Firing)

The core-shell inorganic particle precursor prepared in (4: Solid liquid separation) was fired at a firing temperature of 700° C. for two hours under an environment at atmospheric pressure in an oxygen concentration of 20% to prepare Abrasive particle 1 of a core-shell type having an average particle size of 350 nm.

[Preparation of Abrasive Particle 2]

Abrasive particle 2 of a core-shell type was prepared as in Preparation of Abrasive particle 1 except that the atmosphere in (5: Firing) was replaced by a nitrogen atmosphere having a controlled oxygen concentration of 1000 ppm.

[Preparation of Abrasive Particle 3]

Abrasive particle 3 of a core-shell type was prepared as in Preparation of Abrasive particle 1 except that the atmosphere in (5: Firing) was replaced by a nitrogen atmosphere having a controlled oxygen concentration of 100 ppm.

[Preparation of Abrasive Particle 4]

Abrasive particle 4 of a core-shell type was prepared as in Preparation of Abrasive particle 1 except that the atmosphere in (5: Firing) was replaced by a nitrogen atmosphere having a controlled oxygen concentration of 10 ppm.

[Preparation of Abrasive Particles 5 to 8]

Abrasive particles 5 to 8 were prepared in Preparation of Abrasive particles 1 to 4 except that the firing temperature in (5: Firing) was changed from 700° C. to 450° C.

[Preparation of Abrasive Particles 9 to 12]

Abrasive particles 9 to 12 were prepared as in Preparation of Abrasive particles 1 to 4 except that the firing temperature in (5: Firing) was changed from 700° C. to 900° C.

[Preparation of Abrasive Particle 13]

Cerium oxide particles prepared by a pulverization process and having an average particle size of 860 nm were fired at 700° C. for two hours under an environment at atmospheric pressure of an oxygen concentration of 20% to prepare Abrasive particle 13 of Comparative Example.

[Preparation of Abrasive Particle 14]

Cerium oxide particles prepared by a pulverization process and having an average particle size of 950 nm were fired at 700° C. for two hours under a nitrogen atmosphere of an oxygen concentration of 10 ppm to prepare Abrasive particle 14 of Comparative Example.

[Preparation of Abrasive Particle 15]

Abrasive particle 15 of a core-shell type was prepared as in Preparation of Abrasive particle 1 except that the firing temperature in (5: Firing) was 1100° C.

[Preparation of Abrasive Particle 16]

Abrasive particle 16 of a core-shell type was prepared as in Preparation of Abrasive particle 1 except that the firing temperature in (5: Firing) was 1300° C.

<<Preparation of Slurry of Abrasive Material>>

Powdery Abrasive particles 1 to 16 (100 g/L) were each dispersed in water as a solvent. The solutions were filtrated through a filter having a pore diameter of 5 μm to remove coarse particles. Slurries of Abrasive materials 1 to 16 were thereby prepared.

<<Evaluation of Abrasive Particles>>

[Measurement of Physical Characteristics of Abrasive Particles]

(Determination of Proportion of Trivalent Cerium in Surface Region)

The content of trivalent cerium and that of and quadrivalent cerium in the surface regions ranging from the outermost layers of the abrasive particles to a depth of 10 nm toward the centers of the particles were determined by X-ray photoemission spectroscopic analysis.

The measurement was performed with an X-ray photoelectron spectrometer (XPS) ESCALAB-200R made by VG Scientific Ltd.

In the measurement, the X-ray anode was a monochromatic Al and an output was 25 W (accelerating voltage: 15 kV, emission current: 1.7 mA). The energy resolution specified by the half width of Ag 3d5/2 peak from cleaned silver was set at 0.8 to 0.5 eV.

A sample was measured at a binding energy in the range of −20 eV to 1200 eV and at a data input interval of 1.0 eV to detect elements. All the detected elements were subjected to narrow scanning at a data input interval of 0.2 eV to determine the photoelectron peak having a maximum intensity. The spectra of the elements were thereby obtained. The content of trivalent cerium and that of quadrivalent cerium were calculated from the spectra of the elements to determine the content of trivalent cerium to the total cerium content.

In the X-ray photoemission spectroscopic analysis, the content of trivalent cerium and that of quadrivalent cerium in the region ranging from the outermost layer to a depth of 10 nm of each particle are determined for every 1 nm ion etching of the particles from the outermost layer toward the center using ion beams, and the average content of trivalent cerium to the total cerium content was determined.

(Determination of Coefficient of Variation (CV Value) in Particle Size Distribution)

Abrasive particles 1 to 16 prepared above were photographed with a scanning microscope to capture SEM images, and 100 abrasive particles in each SEM image were selected at random to measure the particle sizes. The average particle size and the standard deviation of particle size distribution were determined from the results of measurement. The coefficient of variation (CV value) in the particle size distribution was determined from the following expression, and was defined as the scale of monodispersion. The projected area diameter of each abrasive particle was determined on the basis of the area of the photographed image of the abrasive particle, and was defined as the particle size of the particle.

Coefficient of variation (%)={(standard deviation of particle size distribution)/(average particle size)}×100

(Determination of Average Aspect Ratio (Average AR))

Abrasive particles 1 to 16 prepared above were photographed with a scanning microscope to capture SEM images, and 100 abrasive particles were selected at random. The ratios a/b were determined from the long diameter a and the short diameter b of the selected abrasive particles, and were averaged to define the average aspect ratio of the abrasive particle. The long diameter a and the short diameter b were determined as follows: The rectangle circumscribing the abrasive particle (referred to as "circumscribed rectangle") was drawn. Among the short sides and the long sides of the circumscribed rectangles, the length of the shortest short side was defined as the short diameter b and the length of the longest long side was defined as the long diameter a.

(Determination of Particle Size $D_{50}$)

Abrasive particles 1 to 16 prepared above were photographed with a scanning microscope to capture SEM images, and 100 abrasive particles in each SEM image were selected at random. In these 100 abrasive particles, the diameter of a circle having an area equal to that of the image of each abrasive particle was determined as the particle size of the abrasive particle.

As shown in FIG. 3, the particle sizes of the individual abrasive particles were plotted along the abscissa, and the cumulative particle number (integral curve) of the abrasive particles was plotted along the ordinate to prepare the cumulative particle size distribution curve on the particle sizes of the abrasive particles.

As shown in FIG. 3, the particle size corresponding to the cumulative number of particles of 50(%) was determined from the cumulative curve, and was defined as $D_{50}$.

(Evaluation of Polishing Rate)

Figure 10:
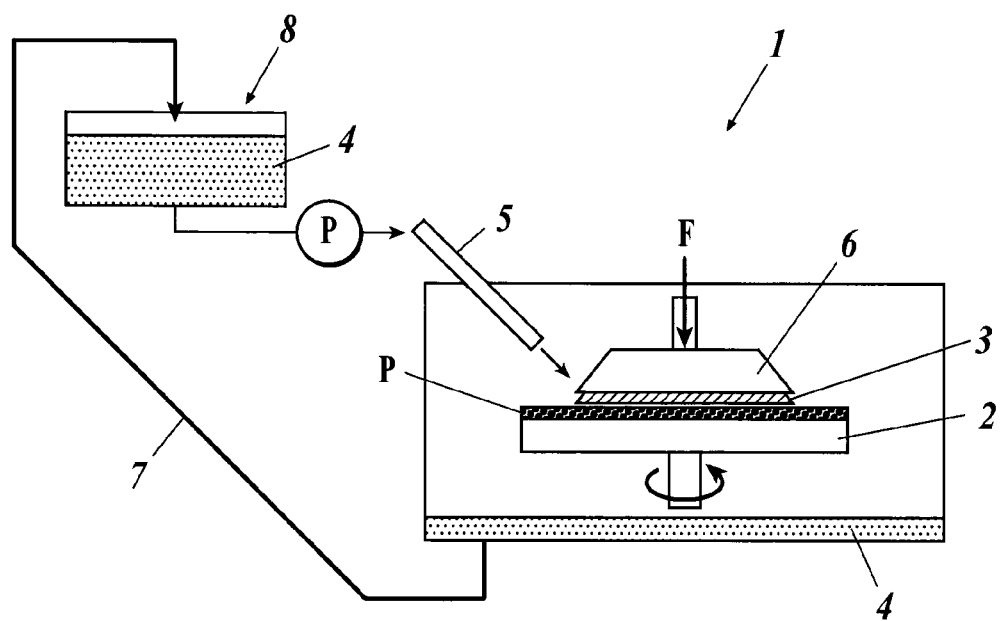
FIG. 10 is a drawing illustrating a schematic configuration of a polisher used in Examples for measurement of the polishing rate.

The polishing rate was measured with a polisher illustrated in FIG. 10.

A polisher 1 includes a rotatable polishing platen 2 having a suede polishing cloth P attached thereto. The polishing platen 2 was rotated at a rotational speed of 50 min$^{-1}$ (rpm) during polishing while a workpiece (48φ crystallized glass substrate) 3 held by a workpiece holder 6 was pressed against the polishing platen 2 under a pressure F of 9.8 kPa (100 g/cm$^2$). A 25° C. slurry of an abrasive material 4 stored in a slurry tank 8 was fed to the polishing cloth P from a slurry nozzle 5 through a pump. The slurry of the abrasive material 4 used in polishing was stored in the bottom of the polisher, and was recovered through a flow path 7 to the slurry tank 8. The slurry was circulated between the polisher 1 and the slurry tank 8 at a flow rate of 10 L/min to polish the workpiece for 30 minutes.

The thicknesses of the workpiece 3 before and after polishing were measured with a digital length measuring system Nikon Digimicro (MF501). The polishing depth (μm) per minute was calculated from the difference in thickness, and was defined as the polishing rate (μm/min).

<Ranking of Polishing Rate>

The polishing rates were ranked according to the following criteria:

S: polishing rate≥0.90 μm/min
A: 0.90 μm/min>polishing rate≥0.70 μm/min
B: 0.70 μm/min>polishing rate≥0.50 μm/min
C: 0.50 μm/min>polishing rate The polishing rates of the cerium oxide abrasive materials were evaluated according to the ranking. A polishing rate of B or higher is of a practically preferred level.

(Determination of Surface Roughness Ra of Workpiece: Evaluation of Smoothness of Polished Surface)

The surface roughness Ra of the workpiece (48φ crystallized glass substrate) was determined by measuring the polished surface of the 48φ crystallized glass substrate polished for 30 minutes in Evaluation of polishing rate with a surface profiler of a light interference type (Dual-channel ZeMapper made by Zygo Corporation). The surface roughness Ra indicates the arithmetic average roughness specified in JIS B0601-2001.

The results are shown in Table 1.

(Step A) An aqueous solution (0.5 L) of 5.0 mol/L urea was prepared, and was heated in a sealed container at 100° C. for six hours. Aqueous urea solution 1 was then cooled to room temperature (step A in FIG. 5).

(Step B) Pure water was added to an aqueous solution (150 mL, 75 mol %) of 1.0 mol/L cerium nitrate and an aqueous solution (50 mL, 25 mol %) of 1.0 mol/L yttrium

TABLE 1

| Abrasive particle No. | Production conditions of abrasive particles | | | | | | Properties of abrasive particles | | | Evaluation results | | |
|---|---|---|---|---|---|---|---|---|---|---|---|---|
| | Particle structure | *1 | Firing conditions | | | Particle shape | *5 | CV value (%) | Average AR | Particle size $D_{50}$ (nm) | Polishing characteristics Polishing rate | *6 | Remarks |
| | | | *2 | *3 | *4 | | | | | | | |
| 1 | Core-shell type | 70 | 20% | 700 | 2 | Spherical | 9.1 | 8.4 | 1.05 | 302 | B | 5.9 | Present invention |
| 2 | Core-shell type | 70 | 1000 ppm | 700 | 2 | Spherical | 17.0 | 7.9 | 1.03 | 305 | A | 4.5 | Present invention |
| 3 | Core-shell type | 70 | 100 ppm | 700 | 2 | Spherical | 20.2 | 7.3 | 1.05 | 312 | A | 4.2 | Present invention |
| 4 | Core-shell type | 70 | 10 ppm | 700 | 2 | Spherical | 32.2 | 8.8 | 1.05 | 323 | A | 5.3 | Present invention |
| 5 | Core-shell type | 70 | 20% | 450 | 2 | Spherical | 12.8 | 8.3 | 1.05 | 305 | B | 5.4 | Present invention |
| 6 | Core-shell type | 70 | 1000 ppm | 450 | 2 | Spherical | 18.5 | 7.7 | 1.03 | 308 | A | 4.2 | Present invention |
| 7 | Core-shell type | 70 | 100 ppm | 450 | 2 | Spherical | 24.2 | 7.4 | 1.05 | 315 | A | 4.3 | Present invention |
| 8 | Core-shell type | 70 | 10 ppm | 450 | 2 | Spherical | 39.3 | 8.7 | 1.05 | 326 | A | 5.0 | Present invention |
| 9 | Core-shell type | 70 | 20% | 900 | 2 | Spherical | 5.2 | 8.3 | 1.05 | 301 | B | 5.8 | Present invention |
| 10 | Core-shell type | 70 | 1000 ppm | 900 | 2 | Spherical | 15.1 | 7.8 | 1.03 | 303 | A | 4.8 | Present invention |
| 11 | Core-shell type | 70 | 100 ppm | 900 | 2 | Spherical | 17.4 | 7.5 | 1.05 | 309 | A | 4.1 | Present invention |
| 12 | Core-shell type | 70 | 10 ppm | 900 | 2 | Spherical | 19.4 | 8.6 | 1.05 | 318 | A | 5.6 | Present invention |
| 13 | Pulverized particle | 74 | 20% | 700 | 2 | Amorphous | 3.9 | 13.3 | 1.59 | 861 | C | 12.9 | Comparative example |
| 14 | Pulverized particle | 74 | 10 ppm | 700 | 2 | Amorphous | 4.7 | 17.1 | 1.88 | 944 | C | 11.3 | Comparative example |
| 15 | Core-shell type | 70 | 20% | 1100 | 2 | Spherical | 4.5 | 9.2 | 1.15 | 250 | A | 9.6 | Comparative example |
| 16 | Core-shell type | 70 | 20% | 1300 | 2 | Spherical | 3.2 | 9.6 | 1.15 | 235 | A | 10.3 | Comparative example |

*1: Cerium content (mol %)
*2: Firing atmosphere (oxygen content)
*3: Firing temperature (° C.)
*4: Firing time (hour)
*5: Trivalent cerium content in the surface region (%)
*6: Surface roughness of workpiece (Å)

The results in Table 1 evidently show that the core-shell abrasive particles according to the present invention having an average content of trivalent cerium within the range of 5 to 40 mol % of the total cerium content in the surface region attained higher polishing rates and lower surface roughness Ra of the polished surface than those in Comparative Examples, and had high polishing characteristics. In contrast, Abrasive particles 13 and 14 prepared by the pulverization process have amorphous shapes having high average aspect ratios. These abrasive particles had an average content of trivalent cerium of less than 5 mol % of the total cerium content in the surface region, resulting in low polishing rates and reduced smoothness of the polished surface.

Core-shell abrasive particles 15 and 16 had low average contents of trivalent cerium to the total cerium content in the surface region, and had insufficient polishing rates.

Although core-shell abrasive particles having an average content of trivalent cerium of more than 40 mol % of the total cerium content in the surface region were prepared by the same method as above, monodispersive spherical particles were not stably prepared.

Example 2

<<Preparation of Abrasive Particles>>
[Preparation of Abrasive Particle 17: Homogeneous Abrasive Particles]

Abrasive particle 17 was prepared by the following procedure.

nitrate to prepare aqueous solution 1 of a salt of a rare earth element (9.5 L). Aqueous solution 1 of a salt of a rare earth element was heated to 90° C. (step B in FIG. 5).

(Step C) Aqueous urea solution 1 (20° C.) prepared (step A) was added to Aqueous solution 1 of a salt of a rare earth element heated to 90° C. at a rate of 1 L/min over 30 seconds to prepare a mixed solution. In this step, nuclear particles were formed (step C in FIG. 5).

(Step D) The mixed solution containing nuclear particles was heated with stirring at 90° C. for two hours to grow particles (step D in FIG. 5).

(Step E) An abrasive particle precursor precipitated in the mixed solution heated with stirring in (step D) was separated through a membrane filter (step E in FIG. 5).

(Step F) The abrasive particle precursor separated in (step E) was fired at 700° C. for two hours under a nitrogen atmosphere in a controlled oxygen concentration of 100 ppm to prepare Abrasive particle 17 having an average content of cerium of 75 mol % of the total content of all the rare earth elements (step F in FIG. 5).

[Preparation of Abrasive Particle 18: Homogeneous Abrasive Particles]

Abrasive particle 18 having an average content of cerium of 81 mol % of the total content of all the rare earth elements was prepared as in Preparation of Abrasive particle 17 except that Aqueous solution 1 of a salt of a rare earth element was replaced by Aqueous solution 2 of a salt of a rare earth element below.

(Preparation of Aqueous Solution of Salt of Rare Earth Element 2)

Pure water was added to an aqueous solution (162 mL, 81 mol %) of 1.0 mol/L cerium nitrate and an aqueous solution (38 mL, 19 mol %) of 1.0 mol/L yttrium nitrate to prepare Aqueous solution 2 of a salt of a rare earth element (9.5 L).

[Preparation of Abrasive Particle 19: Homogeneous Abrasive Particles]

Abrasive particle 19 having an average content of cerium of 88 mol % of the total content of all the rare earth elements was prepared as in Preparation of Abrasive particle 17 except that Aqueous solution 1 of a salt of a rare earth element was replaced by Aqueous solution 3 of a salt of a rare earth element below.

(Preparation of Aqueous Solution 3 of Salt of Rare Earth Element)

Pure water was added to an aqueous solution (176 mL, 88 mol %) of 1.0 mol/L cerium nitrate and an aqueous solution (24 mL, 12 mol %) of 1.0 mol/L yttrium nitrate to prepare Aqueous solution 3 of a salt of a rare earth element (9.5 L).

[Preparation of Abrasive Particle 20: Homogeneous Abrasive Particle]

Abrasive particle 20 having an average content of cerium of 90 mol % of the total content of all the rare earth elements was prepared as in Preparation of Abrasive particle 17 except that Aqueous solution 1 of a salt of a rare earth element was replaced by Aqueous solution 4 of a salt of a rare earth element below.

(Preparation of Aqueous Solution of Salt of Rare Earth Element 4)

Pure water was added to an aqueous solution (180 mL, 90 mol %) of 1.0 mol/L cerium nitrate and an aqueous solution (20 mL, 10 mol %) of 1.0 mol/L yttrium nitrate to prepare Aqueous solution 4 of a salt of a rare earth element (9.5 L).

<<Evaluation of Abrasive Particles>>

Abrasive particles 17 to 20 prepared above and Abrasive particle 2 prepared in Example 1 were measured as in Example 1 to evaluate the proportion of trivalent cerium in the surface region, the coefficient of variation (CV value) in the particle size distribution, the average aspect ratio (average AR), the particle size $D_{50}$, the polishing rate, and the surface roughness Ra of the workpiece. The results are shown in Table 2.

The results in Table 2 evidently show that the homogeneous cerium oxide abrasive particles also attained high polishing rates and high polishing precision (average surface roughness Ra) in the polished surface through control of the average content of trivalent cerium within the range of 5 to 40 mol % of the total cerium content in the surface region ranging from the outermost layer of each cerium oxide abrasive particle to a depth of 10 nm toward the center of the particle. The results also show that the homogeneous cerium oxide abrasive particles attained more excellent effects through control of the average content of cerium within the range of 81 mol % or more of the total content of all the rare earth elements in the particles.

Example 3

An exemplary method for producing a cerium oxide abrasive material according to a preferred embodiment of the present invention will be described in Example 3 below, in which the pH at the reaction temperature of the reaction solution is controlled within the range of 4.5 to 7.0 in step 2 (heating a reaction solution to prepare an abrasive particle precursor).

<Preparation of Abrasive Particle 101>

Core-shell abrasive particle 101 was prepared by the following procedure.

(1) An aqueous solution (10 L) of 0.03 mol/L yttrium nitrate was prepared. An aqueous urea solution was prepared, and was mixed with the aqueous yttrium nitrate solution such that the urea concentration was 0.60 mol/L. The mixed solution was heated at 90° C. with stirring to prepare seed crystals.

(2) An aqueous solution of 2.4 mol/L yttrium nitrate was added to the reaction solution prepared in Procedure (1) at a rate of 5 mL/min for 65 minutes while being heated at 90° C. with stirring. Cores composed of basic carbonate were thereby formed.

(3) A mixed solution of an aqueous solution of 0.72 mol/L yttrium nitrate and an aqueous solution of 1.68 mol/L cerium nitrate was added to the reaction solution prepared in Procedure (2) at a rate of 5 mL/min for 65 minutes while being heated at 90° C. with stirring. Shell 2 was thereby formed.

TABLE 2

| | Production conditions of abrasive particles | | | | | Evaluation results | | | | | |
|---|---|---|---|---|---|---|---|---|---|---|---|
| | | | Firing conditions | | | | | | | Surface | |
| | | | Firing | | | Properties of abrasive particles | | | | Polishing | roughness |
| Abrasive particle No. | Particle structure | *1 | atmosphere (oxygen content) | *2 | Firing time (hour) | Particle shape | *3 | CV value (%) | Average AR | Particle size $D_{50}$ (nm) | characteristics Polishing rate | of workpiece (Å) | Remarks |
| 2 | Core-shell type | 70 | 1000 ppm | 700 | 2 | Spherical | 17.0 | 7.9 | 1.03 | 305 | A | 4.5 | Present invention |
| 17 | Homageneous particle | 75 | 1000 ppm | 700 | 2 | Spherical | 17.8 | 7.4 | 1.05 | 315 | A | 4.9 | Present invention |
| 18 | Homogeneous particle | 81 | 1000 ppm | 700 | 2 | Spherical | 20.9 | 7.0 | 1.04 | 302 | S | 4.0 | Present invention |
| 19 | Homogeneous particle | 88 | 1000 ppm | 700 | 2 | Spherical | 22.8 | 6.9 | 1.04 | 308 | S | 3.7 | Present invention |
| 20 | Homogeneous particle | 90 | 1000 ppm | 700 | 2 | Spherical | 24.4 | 6.8 | 1.03 | 310 | S | 3.3 | Present invention |

*1: Cerium content (mol %)
*2: Firing temperature (° C.)
*3: Trivalent cerium content in the surface region (%)

(4) A precipitated core-shell inorganic particle precursor was separated from the reaction solution prepared in Procedure (3) through a membrane filter.

The reaction solution was sampled for every 15 minutes during preparation of the precursor to measure the pH of the reaction solution at a reaction temperature of 90° C. An acid or an alkali was added to the reaction solution to control the pH of the reaction solution at a reaction temperature of 90° C. to be 6.6. The acid used was an aqueous solution of 0.1 mol/L nitric acid, and the alkali used was an aqueous solution of 0.1 mol/L ammonia. The pH meter used was F-71 pH Electrode 9615-10D made by HORIBA, Ltd.

(5) The precursor prepared in Procedure (4) was heated to 500° C., and was fired (kept) for one hour to prepare Core-shell abrasive particle 101.

<Preparation of Abrasive Particles 102, 105, 106, 109, and 110>

Core-shell abrasive particles 102, 105, 106, 109, and 110 according to the present invention were prepared as in Preparation of Abrasive particle 101 except that the pH (6.6) of the reaction solution in Preparation of Abrasive particle 101 was controlled to be the respective values shown in Table 3 at a reaction temperature of 90° C. through addition of the aqueous nitric acid solution or the aqueous ammonia solution to the reaction solution.

<Preparation of Abrasive Particle 103>

Homogeneous abrasive particle 103 was prepared by the following procedure.

(1) An aqueous solution (0.5 L) of 5.0 mol/L urea was prepared, and was heated in a sealed container at 100° C. for six hours. The aqueous urea solution was then cooled to room temperature.

(2) Pure water was added to an aqueous solution (200 mL) of 1.0 mol/L cerium nitrate, and the resulting aqueous solution (9.5 L) was heated to 90° C.

(3) The aqueous urea solution prepared in Procedure (1) was added to the aqueous cerium nitrate solution heated to 90° C. in Procedure (2) at a rate of 0.5 L/min.

(4) The mixed solution of the aqueous cerium nitrate solution and the aqueous urea solution prepared in Procedure (3) was heated at 90° C. for two hours with stirring.

(5) An abrasive particle precursor precipitated in the mixed solution heated in Procedure (4) was separated through a membrane filter. The reaction solution was sampled for every 15 minutes during preparation of the precursor to measure the pH of the reaction solution at a reaction temperature of 90° C. An acid or an alkali was added to the reaction solution to control the pH of the reaction solution at a reaction temperature of 90° C. to be 4.6. The acid used was an aqueous solution of 0.1 mol/L nitric acid, and the alkali used was an aqueous solution of 0.1 mol/L ammonia.

(6) The abrasive particle precursor separated in Procedure (5) was fired at 600° C. to prepare Abrasive particle 103.

<Preparation of Abrasive Particles 104, 107, 108, 111, and 112>

Abrasive particles 104, 107, 108, 111, and 112 according to the present invention were prepared as in Preparation of Abrasive particle 103 except that the pH (4.6) of the reaction solution in Preparation of Abrasive particle 101 was controlled to be the respective values shown in Table 3 at a reaction temperature of 90° C. through addition of the nitric acid aqueous solution and the aqueous ammonia solution to the reaction solution.

<Preparation of Abrasive Particle 113>

(1) An aqueous solution (10 L) of 0.03 mol/L yttrium nitrate was prepared. An aqueous urea solution was prepared, and was added to the aqueous yttrium nitrate solution such that the urea concentration was 0.40 mol/L. The mixed solution was heated at 90° C. with stirring to prepare seed crystals.

(2) An aqueous solution of 2.4 mol/L yttrium nitrate and an aqueous solution of 1.5 mol/L urea were added to the reaction solution prepared in Procedure (1) at a rate of 5 mL/min for 65 minutes while being heated at 90° C. with stirring. Cores composed of basic carbonate were thereby prepared.

(3) A mixed solution of an aqueous solution of 0.72 mol/L yttrium nitrate and an aqueous solution of 1.68 mol/L cerium nitrate and an aqueous solution of 1.5 mol/L urea were added to the reaction solution prepared in Procedure (2) at a rate of 5 mL/min for 65 minutes while being heated at 90° C. with stirring. Shell 2 was thereby formed.

(4) The core-shell inorganic particle precursor precipitated in the reaction solution prepared in Procedure (3) was separated through a membrane filter.

The reaction solution was sampled for every 15 minutes during preparation of the precursor to measure the pH of the reaction solution at a reaction temperature of 90° C. The pH of the reaction solution was 6.2 at a reaction temperature of 90° C.

(5) The precursor prepared in Procedure (4) was heated to 500° C., and was fired (kept) for one hour to prepare Core-shell abrasive particle 113.

<Preparation of Abrasive Particle 114>

Abrasive particle 114 was prepared as in Preparation of Abrasive particle 113 except that the concentration of the aqueous urea solution added in Procedures (2) and (3) was 2.0 mol/L. The pH of the reaction solution was 5.2 at a reaction temperature of 90° C.

<Preparation of Abrasive Particle 115>

(1) An aqueous solution (0.5 L) of 5.0 mol/L urea was prepared, and was heated in a sealed container at 100° C. for six hours. The aqueous urea solution was then cooled to room temperature.

(2) Pure water was added to an aqueous solution (200 mL) of 1.0 mol/L cerium nitrate, and the resulting aqueous solution (9.5 L) was heated to 90° C.

(3) The aqueous urea solution prepared in Procedure (1) was added to the aqueous cerium nitrate solution heated to 90° C. in Procedure (2) at a rate of 0.5 L/min.

(4) An aqueous solution of 1.5 mol/L urea was added to the mixed solution in Procedure (3) at a rate of 5 mL/min for two hours while being heated at 90° C. with stirring.

(5) The abrasive particle precursor precipitated in the mixed solution heated in Procedure (4) was separated through a membrane filter. The reaction solution was sampled for every 15 minutes during preparation of the precursor to measure the pH of the reaction solution at a reaction temperature of 90° C. The pH of the reaction solution was 5.0 at a reaction temperature of 90° C.

(6) The abrasive particle precursor separated in Procedure (5) was fired at 600° C. to prepare Abrasive particle 115.

<Preparation of Abrasive Particle 116>

Abrasive particle 116 was prepared as in Preparation of Abrasive particle 115 except that the concentration of the aqueous urea solution added in Procedure (4) was 1.2 mol/L. The pH of the reaction solution was 6.3 at a reaction temperature of 90° C.

<Preparation of Abrasive Particles 117 to 125>

Abrasive particles 117 to 125 were prepared as in Preparation of Abrasive particle 103 except that nitrates of the rare earth elements shown in Table 3 were used without varying the compositional ratio (mol %) and the total amount of the rare earth elements in the aqueous solution of a salt of a rare earth element and the pH was varied as shown in Table 3.

<Evaluation on Abrasive Particles>

Abrasive particles 101 to 125 were evaluated for the composition, the shape, and the polishing performance by the following methods.

1. Elemental Analysis

Abrasive particles 101 to 125 (1 g) were each dissolved in a mixed solution of an aqueous nitric acid solution (10 ml) and a hydrogen peroxide solution (1.0 ml). The mixed solution was subjected to elemental analysis with ICP atomic emission spectrometer (ICP-AES) made by SII NanoTechnology Inc. The average contents of the rare earth elements contained in the abrasive particles of the abrasive material were determined as a compositional ratio (mol %). The results are shown in Table 3.

2. Shape of Particle and Average Aspect Ratio

Abrasive particles 101 to 125 prepared above were photographed with a scanning microscope to capture SEM images, and 100 abrasive particles in each SEM image were selected at random. The ratios a/b were determined from the long diameter a and the short diameter b of the selected abrasive particles, and were averaged to define the average aspect ratio (average AR) of the abrasive particle. The long diameter a and the short diameter b were determined as follows: The rectangle circumscribing the abrasive particle (referred to as "circumscribed rectangle") was drawn. Among the short sides and the long sides of the circumscribed rectangles, the length of the shortest short side was defined as the short diameter b and the length of the longest long side was defined as the long diameter a.

Abrasive particles having an average aspect ratio within the range of 1.00 to 1.15, more preferably 1.00 to 1.05 were classified as spherical particles. Abrasive particles having an average aspect ratio out of the range of 1.00 to 1.15 were classified as amorphous particles.

3. Coefficient of Variation (CV Value) in Particle Size Distribution

The coefficient of variation (also referred to as "monodispersity") in the particle size distribution can be determined from an SEM image of 100 abrasive particles to evaluate the monodispersion. The particle size of the particle was defined as a projected area diameter determined on the basis of the area of the photographed image of the particle. The arithmetic average of particle sizes of the particles was defined as an average particle size.

The coefficient of variation in the particle size distribution was determined from the following expression:

Coefficient of variation (%)={(standard deviation of particle size distribution)/(average particle size)}×100

4. Polishing Rate

The polishing rate was measured by polishing the surface of a workpiece placed on a polisher with a polishing cloth while a slurry of an abrasive material prepared by dispersing a powdery abrasive material containing the abrasive particles in a solvent, such as water, was being fed to the surface of the workpiece. The slurry of the abrasive material contained 100 g/L abrasive material and only water as a dispersive medium. The slurry was filtered through a filter having a pore diameter of 5 μm. Polishing in a polishing test was performed while the slurry of the abrasive material was being circulated at a flow rate of 5 L/min. A glass substrate having a diameter of 65 mm was used as the workpiece, and the polishing cloth used was made of polyurethane. The surface of the workpiece was polished under a pressure of 9.8 kPa (100 g/cm$^2$) for 30 minutes with a test polisher at a rotational speed of 100 min$^{-1}$ (rpm). The thicknesses of the workpiece before and after polishing were measured with a digital length measuring system Nikon Digimicro (MF501). The polishing depth (μm) per minute was calculated from the difference in thickness, and was defined as the polishing rate.

5. Surface Roughness

The surface state (surface roughness Ra) of the glass substrate was evaluated by measuring the surface roughness of the glass substrate polished for 30 minutes in "4. Polishing rate" with a surface profiler of a light interference type (Dual-channel ZeMapper made by Zygo Corporation). The surface roughness Ra indicates the arithmetic average roughness specified in JIS B0601-2001.

The results of the evaluations are summarized in Table 3.

Comparative Abrasive particles 109 to 112 in Table 3 aggregated during growth of particles, and the resulting particles did not have uniform particle sizes. The particle size was defined as the average of the long diameters and the short diameters of the aggregated particles.

TABLE 3

| *1 | *2 | Particle shape | Particle composition (mol %) | | pH value | *3 | Average AR | CV value (%) | Surface roughness Ra (Å) | Remarks |
|---|---|---|---|---|---|---|---|---|---|---|
| 101 | 101 | Spherical | Y/Ce | 80/20 | 6.6 | 1.2 | 1.05 | 9.8 | 8.6 | Example |
| 102 | 102 | Spherical | Y/Ce | 80/20 | 4.8 | 1.1 | 1.10 | 8.6 | 7.1 | Example |
| 103 | 103 | Spherical | Ce | 100 | 4.6 | 1.5 | 1.03 | 6.6 | 6.8 | Example |
| 104 | 104 | Spherical | Ce | 100 | 6.8 | 1.4 | 1.04 | 7.9 | 7.8 | Example |
| 105 | 105 | Spherical | Y/Ce | 80/20 | 6.2 | 1.0 | 1.03 | 7.4 | 5.5 | Example |
| 106 | 106 | Spherical | Y/Ce | 80/20 | 5.2 | 1.3 | 1.03 | 6.3 | 4.9 | Example |
| 107 | 107 | Spherical | Ce | 100 | 5.5 | 1.2 | 1.02 | 4.8 | 5.9 | Example |
| 108 | 108 | Spherical | Ce | 100 | 5.8 | 1.4 | 1.02 | 5.2 | 4.3 | Example |
| 109 | 109 | Amorphous | Y/Ce | 80/20 | 4.3 | 19.8 | 1.18 | 52.1 | 15.3 | Comparative example |
| 110 | 110 | Amorphous | Y/Ce | 80/20 | 7.9 | 29.5 | 1.31 | 60.4 | 16.9 | Comparative example |
| 111 | 111 | Amorphous | Ce | 100 | 4.0 | 23.1 | 1.35 | 49.1 | 18.7 | Comparative example |
| 112 | 112 | Amorphous | Ce | 100 | 72 | 26.1 | 1.20 | 38.7 | 17.8 | Comparative example |
| 113 | 113 | Spherical | Y/Ce | 80/20 | 6.2 | 1.2 | 1.02 | 5.0 | 3.7 | Example |
| 114 | 114 | Spherical | Y/Ce | 80/20 | 5.2 | 1.4 | 1.05 | 6.6 | 4.2 | Example |
| 115 | 115 | Spherical | Ce | 100 | 5.0 | 1.3 | 1.03 | 4.8 | 4.5 | Example |
| 116 | 116 | Spherical | Ce | 100 | 6.3 | 1.1 | 1.04 | 5.8 | 3.9 | Example |

TABLE 3-continued

| *1 | *2 | Particle shape | Particle composition (mol %) | | pH value | *3 | Average AR | CV value (%) | Surface roughness Ra (Å) | Remarks |
|---|---|---|---|---|---|---|---|---|---|---|
| 117 | 117 | Spherical | Ce/Y | 90/10 | 5.4 | 1.4 | 1.08 | 7.2 | 6.2 | Example |
| 118 | 118 | Spherical | Ce/Gd | 90/10 | 6.3 | 1.5 | 1.13 | 6.9 | 7.1 | Example |
| 119 | 119 | Spherical | Ce/Tb | 90/10 | 50 | 1.8 | 1.07 | 7.0 | 7.9 | Example |
| 120 | 120 | Spherical | Ce/Dy | 90/10 | 5.2 | 1.6 | 1.06 | 8.1 | 6.7 | Example |
| 121 | 121 | Spherical | Ce/Ho | 90/10 | 6.4 | 1.3 | 1.09 | 5.9 | 5.9 | Example |
| 122 | 122 | Spherical | Ce/Er | 90/10 | 6.0 | 1.4 | 1.10 | 5.5 | 7.0 | Example |
| 123 | 123 | Spherical | Ce/Tm | 90/10 | 6.2 | 1.5 | 1.14 | 5.5 | 8.4 | Example |
| 124 | 124 | Spherical | Ce/Yb | 90/10 | 5.8 | 1.5 | 1.09 | 6.8 | 8.2 | Example |
| 125 | 125 | Spherical | Ce/Lu | 90/10 | 5.5 | 1.1 | 1.08 | 6.4 | 7.9 | Example |

*1: Abrasive No.
*2: Abrasive particle No.
*3: Average particle size (μm)

The results in Table 3 evidently show that the compositional ratio (mol %) of the rare earth elements contained in the abrasive particles in each abrasive material corresponded to the concentrations and the contents of the rare earth elements in the aqueous solutions added in the process of producing the abrasive material. The results in Table 3 also show that Abrasive particles 101 to 108 and 113 to 125 according to the present invention prepared with the reaction solutions having a pH of 4.5 to 7.0 had lower sphericity (shape of the particle and average aspect ratio) and lower coefficients of variation (CV value) in the particle size distribution and higher polishing rates than those of Abrasive particles 109 to 112 of Comparative Examples. The results also show that the abrasive materials of Examples attained lower surface roughness than those of Comparative Examples, and reduced scratches.

Example 4

An exemplary cerium oxide abrasive material according to a preferred embodiment of the present invention having a half width of the main peak within the range of 0.17 to 0.25° in the powder X ray diffraction pattern of the cerium oxide abrasive particles will be described in Example 4 below.

[Preparation of Abrasive Particle 201]

(Step 1)

An aqueous solution (0.5 L) of 5.0 mol/L urea was prepared, and was placed in a container. The container was sealed, and the aqueous solution was heated to 100° C. for six hours to decompose urea at a high temperature. The aqueous urea solution was then cooled to 20° C. to prevent scattering of the carbon dioxide generated through decomposition of urea, increasing a large amount of carbon dioxide present in the aqueous urea solution.

(Step 2)

An aqueous solution (140 mL) of 1.0 mol/L cerium nitrate and an aqueous solution (60 mol/L) of 1.0 mol/L lanthanum nitrate were mixed, and pure water was added to prepare an aqueous solution (9.5 L) of rare earth elements (cerium:lanthanum=70:30 (atomic ratio)). This aqueous solution of rare earth elements was heated to 90° C.

(Step 3)

The aqueous solution (9.5 L) of rare earth elements heated to 90° C. was placed in a mixing tank provided with an axial-flow stirrer. While the aqueous solution of rare earth elements was being stirred, the aqueous urea solution (20° C.) prepared in step 1 was added at a rate of 0.5 mL/min. The solutions were stirred at 90° C. for 120 minutes to prepare a cerium oxide particle precursor solution containing basic carbonate.

(Step 4: Solid Liquid Separation)

A cerium oxide particle precursor containing basic carbonate was separated from the cerium oxide particle precursor solution containing basic carbonate through a membrane filter.

(Step 5: Firing)

The separated cerium oxide particle precursor containing basic carbonate was fired with a commercially available roller hearth kiln at a temperature of 700° C. for one hour to prepare Abrasive particle 201 having an average particle size of 1.3 μm and containing 70 mol % cerium oxide and 30 mol % lanthanum oxide.

[Preparation of Abrasive Particles 202 to 204]

Abrasive particles 202 to 204 were prepared as in steps to Solid liquid separation of cerium oxide as in Preparation of Abrasive particle 201. The firing temperature of Abrasive particles 202 to 204 in the firing step were varied from 700° C. to 800° C., 900° C., and 1000° C., respectively.

[Preparation of Abrasive Particles 205 to 207]

A cerium oxide particle precursor was prepared as in Preparation of Abrasive particle 201 except that the ratio of the aqueous cerium nitrate solution to the aqueous lanthanum nitrate solution used in preparation of the cerium oxide particle precursor was changed such that the cerium content shown in Table 4 was obtained. The cerium oxide particle precursor was then separated through a membrane filter as in Preparation of Abrasive particle 201, and was fired at 700° C. for one hour to prepare Abrasive particles 205 to 207.

[Preparation of Abrasive Particles 208 to 210]

The aqueous urea solution was added at a higher rate within the range of 0.5 mL/min to 1.0 mL/min in step 3 in preparation of the cerium oxide particle precursor for Abrasive particle 206 to prepare cerium oxide particle precursors having average aspect ratios closer to sphericity. The cerium oxide particle precursors were separated through a membrane filter as in Preparation of Abrasive particle 6, and were fired at 700° C. for one hour to prepare Abrasive particles 208 to 210.

[Preparation of Abrasive Particles 211 and 212]

The same operation was performed to Solid liquid separation of cerium oxide as in Preparation of Abrasive particle 201. The firing temperature in the firing step was changed from 700° C. to 650° C. and 1100° C. to prepare Comparative Abrasive particles 211 and 212, respectively.

[Preparation of Abrasive Particle 213]

Abrasive particle 213 was prepared by the following pulverization process.

Commercially available cerium carbonate (6 kg) was placed in an alumina container. The container was kept under an air atmosphere at 750° C. for two hours, and then at 500° C. for two hours to fire cerium carbonate. A yellow white powder (3 kg) was thereby prepared.

The phase of this powder was identified by X ray diffraction; it was verified that the powder was cerium oxide. The fired powder had a particle size of 30 to 100 µm.

The cerium oxide powder (3 kg) was dry-pulverized with a jet mill such that the abrasive particles had an average particle size shown in Table 4. Abrasive particle 213 composed of cerium oxide particles was thereby prepared.

[Preparation of Abrasive Particle 214]

Abrasive particle 214 was prepared by the following pulverization process.

Commercially available cerium carbonate (6 kg) was placed in an alumina container. The container was kept under an air atmosphere at 950° C. for one hour, and then at 500° C. for two hours to fire cerium carbonate. A yellow white powder (3 kg) was thereby prepared.

The phase of this powder was identified by X ray diffraction; it was verified that the powder was cerium oxide. The fired powder had a particle size of 30 to 100 µm.

The cerium oxide powder (3 kg) was dry-pulverized with a jet mill such that the abrasive particles had an average particle size shown in Table 4. Cerium oxide particles were thereby prepared.

The cerium oxide particles (1000 g), an aqueous solution (40 mass %, 80 g) of poly(ammonium acrylate) salt, and deionized water (3920 g) were mixed, and were ultrasonically dispersed with stirring for 10 minutes. The dispersion was left to stand for sedimentation at room temperature for four hours, and the supernatant was extracted. The supernatant solution was filtered through a filter having a pore diameter of 10 µm to prepare Abrasive particle 214 composed of cerium oxide particles.

<<Evaluation on Abrasive Particles>>

The abrasive particles were evaluated for the half width of the main peak in the powder X ray diffraction pattern, and the average particle size and the shape of the particles by the following methods.

(Determination of Average Particle Size)

The average particle size was determined as follows: Abrasive particles were observed with a scanning electron microscope to capture an SEM image, and the sizes of 100 particles in the SEM image were determined from the projected area diameter on the basis of the area of each particle. The sizes of the 100 particles were averaged to determine the average particle size.

(Determination of Shape of Abrasive Particle)

The shape of the abrasive particle was determined as follows: Abrasive particles 201 to 214 were photographed with a scanning microscope to capture SEM images, and 100 abrasive particles in each SEM image were selected at random. The ratios a/b were determined from the long diameter a and the short diameter b of the selected abrasive particles, and were averaged to determine the average aspect ratio (average AR) of the abrasive particle. The long diameter a and the short diameter b were determined as follows: The rectangle circumscribing the abrasive particle (referred to as "circumscribed rectangle") was drawn. Among the short sides and the long sides of the circumscribed rectangles, the length of the shortest short side was defined as the short diameter b and the length of the longest long side was defined as the long diameter a. The results are shown in Table 4.

(Determination of Half Width of Main Peak in Powder X Ray Diffraction Pattern)

Abrasive particles 201 to 214 were subjected to powder X ray diffraction on the following conditions with the following apparatus:

Apparatus: powder X ray diffraction analyzer MiniFlexII (made by Rigaku Corporation)

CuKα rays were used as an X-ray source. The half width of the crystal used was the value calculated in the main peak ((111) plane) in the X ray diffraction. The results are shown in Table 4.

Abrasive particles 201 to 212 (1 g) were each dissolved in a mixed solution of an aqueous nitric acid solution (10 mL) and a hydrogen peroxide solution. The mixed solution was subjected to elemental analysis with ICP atomic emission spectrometer (ICP-AES) made by SII NanoTechnology Inc. The average contents of the rare earth elements in each abrasive particle were determined as a compositional ratio (mol %). It was verified that the rare earth elements were contained in a compositional ratio shown in Table 4.

<<Evaluation of Abrasive Materials>>

(Evaluation on Polishing Rate)

The polisher used in polishing polishes the surface of a workpiece placed on a polisher with a polishing cloth while feeding a slurry of an abrasive material prepared by dispersing a powdery abrasive material containing the abrasive particles in a solvent, such as water, to the surface of the workpiece. The slurry of the abrasive material contained 100 g/L abrasive material and only water as a dispersive medium. Polishing in a polishing test was performed while the slurry of the abrasive material was being circulated at a flow rate of 10 L/min. A glass substrate having a diameter of 65 mm was used as the workpiece, and the polishing cloth used was made of polyurethane. The surface of the workpiece was polished under a pressure of 9.8 kPa (100 g/cm$^2$) for 30 minutes with a test polisher at a rotational speed of 50 min$^{-1}$ (rpm).

The thicknesses of the workpiece before and after polishing were measured with a digital length measuring system Nikon Digimicro (MF501). The polishing depth (µm) per minute was calculated from the difference in thickness, and was defined as the polishing rate.

As a result, all the abrasive materials other than Abrasive material 211 had substantially equal polishing rates within the range of 0.70±0.035 µm/min whereas only Abrasive material 211 had a low polishing rate of 0.55 µm/min.

(Evaluation on Scratch)

Scratches on the surface of the substrate were evaluated as follows: The irregularity of the surfaces of five glass substrates were measured with Dual-channel ZeMapper made by Zygo Corporation. The surfaces with 50 to 100 µm of five glass substrates were visually observed, and the number of scratches in the glass substrates were averaged to determine the average number of scratches per substrate.

The results are shown in Table 4.

TABLE 4

| Abrasive No. | Abrasive particle No. | Production method of abrasive particles | Cerium content (mol %) | Firing temperature (° C.) | Average particle size (μm) | Particle shape | Average AR | Powder Xray half band width (°) | Scratch (number) | Remarks |
|---|---|---|---|---|---|---|---|---|---|---|
| 201 | 201 | Solution precipitation | 70 | 700 | 1.3 | Spherical | 1.03 | 0.248 | 5 | Present invention |
| 202 | 202 | Solution precipitation | 70 | 800 | 1.3 | Spherical | 1.03 | 0.218 | 5 | Present invention |
| 203 | 203 | Solution precipitation | 70 | 900 | 1.3 | Spherical | 1.03 | 0.189 | 5 | Present invention |
| 204 | 204 | Solution precipitation | 70 | 1000 | 1.3 | Spherical | 1.03 | 0.175 | 5 | Present invention |
| 205 | 205 | Solution precipitation | 81 | 700 | 1.3 | Spherical | 1.03 | 0.248 | 2 | Present invention |
| 206 | 206 | Solution precipitation | 88 | 700 | 1.3 | Spherical | 1.03 | 0.248 | 2 | Present invention |
| 207 | 207 | Solution precipitation | 90 | 700 | 1.3 | Spherical | 1.03 | 0.248 | 2 | Present invention |
| 208 | 208 | Solution precipitation | 88 | 700 | 1.3 | Spherical | 1.05 | 0.248 | 3 | Present invention |
| 209 | 209 | Solution precipitation | 88 | 700 | 1.3 | Spherical | 1.02 | 0.248 | 1 | Present invention |
| 210 | 210 | Solution precipitation | 88 | 700 | 1.3 | Spherical | 1.01 | 0.248 | 1 | Present invention |
| 211 | 211 | Solution precipitation | 70 | 650 | 1.3 | Spherical | 1.03 | 0.329 | 5 | Comparative example |
| 212 | 212 | Solution precipitation | 70 | 1100 | 1.3 | Amorphous | 1.30 | 0.163 | 20 | Comparative example |
| 213 | 213 | Pulverization | 100 | 750 | 1.2 | Amorphous | 1.18 | 0.317 | 10 | Comparative example |
| 214 | 214 | Pulverization | 100 | 950 | 1.2 | Amorphous | 1.20 | 0.238 | 100 | Comparative example |

The results in Table 4 evidently show that Abrasive materials 201 to 210 according to the present invention barely formed scratches and had high polishing performance. It is believed that such a small number of scratches were attained because these abrasive materials had half widths of the main peaks within the range of 0.17 to 0.25° in the powder X ray diffraction patterns and had a spherical shape.

In contrast, Abrasive material 211 of Comparative Example prepared at a low firing temperature had a half width of the main peak out of the range of 0.17 to 0.25° in the powder X ray diffraction pattern. Although the number of scratches was not significantly different from those in the abrasive materials according to the present invention, Abrasive material 211 had a low polishing rate of about 80% of those of the abrasive materials according to the present invention, which was not suitable for practical use. Abrasive material 212 of Comparative Example prepared at a high firing temperature formed a large number of scratches. It is believed that this is because Abrasive material 212 contained irregular abrasive particles due to firing, resulting in a high average aspect ratio.

Furthermore, it is believed that a large number of scratches were formed because Abrasive materials 213 and 214 contained irregular abrasive particles prepared by the pulverization process.

INDUSTRIAL APPLICABILITY

The cerium oxide abrasive material according to the present invention comprises abrasive particles having high sphericity and high polishing performance (polishing rate and polishing precision of the polished surface), and can be preferably used in precise polishing.

DESCRIPTION OF SYMBOLS

1: Polisher
2: Polishing platen
3: Workpiece
4: Slurry of abrasive material
5: Slurry nozzle
6: Workpiece holder
7: Flow path
8: Slurry tank
C: Core
F: Pressure
P: Polishing cloth
S: Shell
Step A: Preparation of aqueous precipitant solution
Step B: Preparation of aqueous solution of salt of rare earth element
Step C: Addition of aqueous precipitant solution (formation of nuclei)
Step D: Heating with stirring (growth of particles)
Step E: Solid liquid separation
Step F: Firing

The invention claimed is:

1. A cerium oxide abrasive material comprising spherical cerium oxide abrasive particles prepared by a synthetic method using an aqueous solution of a salt of a rare earth element and a precipitant,
wherein the cerium oxide abrasive particles have a spherical shape having an average aspect ratio within the range of 1.00 to 1.15; and
the cerium oxide abrasive particles each have a core-shell structure comprising:
a core containing at least one of Y, Ti, Sr, Ba, Sm, Eu, Gd, and Tb; and a shell containing Ce and at least one of Y, Ti, Sr, Ba, Sm, Eu, Gd, and Tb.

2. The cerium oxide abrasive material according to claim 1, wherein an average content of trivalent cerium is within the range of 5 to 40 mol % of the total cerium content in a surface region ranging from the outermost layer of each cerium oxide abrasive particle to a depth of 10 nm toward a center of the particle.

3. The cerium oxide abrasive material according to claim 1, wherein a particle size $D_{50}$ (nm) determined from a cumulative particle size distribution curve of the cerium oxide abrasive particles is within the range of 50 to 500 nm.

4. The cerium oxide abrasive material according to claim 1, wherein a particle size $D_{10}$ (nm) determined from a cumulative particle size distribution curve of the cerium oxide abrasive particles is within the range of 0.70 to 0.95 times the particle size $D_{50}$ (nm).

5. The cerium oxide abrasive material according to claim 1, wherein a particle size $D_{90}$ (nm) determined from a cumulative particle size distribution curve of the cerium oxide abrasive particles is within the range of 1.10 to 1.35 times the particle size $D_{50}$ (nm).

6. The cerium oxide abrasive material according to claim 1, wherein an average content of cerium in the cerium oxide abrasive particles is 81 mol % or more of the total content of all the rare earth elements in the particles.

7. The cerium oxide abrasive material according to claim 1, wherein a half width of a main peak in a powder X ray diffraction pattern of the cerium oxide abrasive particles is within the range of 0.17 to 0.25°.

8. The cerium oxide abrasive material according to claim 7, wherein the cerium oxide abrasive particles have a spherical shape having an average aspect ratio within the range of 1.00 to 1.02.

9. A method for producing a cerium oxide abrasive material, wherein the cerium oxide abrasive material according to claim 1 is produced through steps 1 to 4, Step 1: mixing an aqueous solution of a salt of a rare earth element containing cerium with a precipitant solution to prepare a reaction solution, Step 2: heating the reaction solution to prepare an abrasive particle precursor, Step 3: separating the abrasive particle precursor from the reaction solution, and Step 4: firing the separated abrasive particle precursor to form cerium oxide abrasive particles.

10. The method for producing a cerium oxide abrasive material according to claim 9, wherein a firing temperature in the firing step is within the range of 450 to 900° C.

11. The method for producing the cerium oxide abrasive material according to claim 7, wherein the abrasive particles are prepared by firing at least a cerium oxide particle precursor mainly composed of cerium oxide precipitated in a solution, and the firing treatment is performed at a firing temperature within the range of 700 to 1000° C.

12. The method for producing a cerium oxide abrasive material according to claim 11, wherein a firing apparatus for firing the cerium oxide particle precursor in the firing step is a roller hearth kiln or a rotary kiln.

13. The method for producing a cerium oxide abrasive material according to claim 9, wherein the pH of the reaction solution is controlled within the range of 4.5 to 7.0 in the step 2.

14. The method for producing a cerium oxide abrasive material according to claim 13, wherein urea is added to the reaction solution as a pH adjuster for the reaction solution.

15. The method for producing a cerium oxide abrasive material according to claim 13, wherein an aqueous acidic or alkaline solution is added to the reaction solution as pH adjusters for the reaction solution.

16. The method for producing a cerium oxide abrasive material according to claim 13, wherein the pH of the reaction solution is controlled within the range of 5.0 to 6.5 in the step of preparing the abrasive particle precursor.

* * * * *